CHARLES L. ELLIOT
OWEN J. OTT
JAMES W. TUSKA
ARTHUR A. BRANT
INVENTORS

Oct. 26, 1965 C. L. ELLIOT ETAL 3,214,686
DRILL HOLE ELECTROMAGNETIC METHOD AND APPARATUS
FOR GEOPHYSICAL EXPLORATION UTILIZING IN-PHASE
AND OUT-OF-PHASE NULLING VOLTAGES
Filed Sept. 6, 1960 11 Sheets-Sheet 2
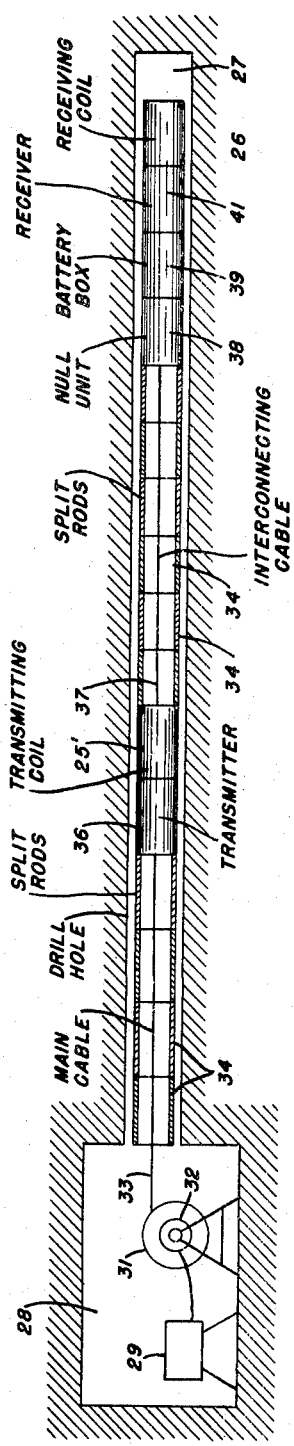
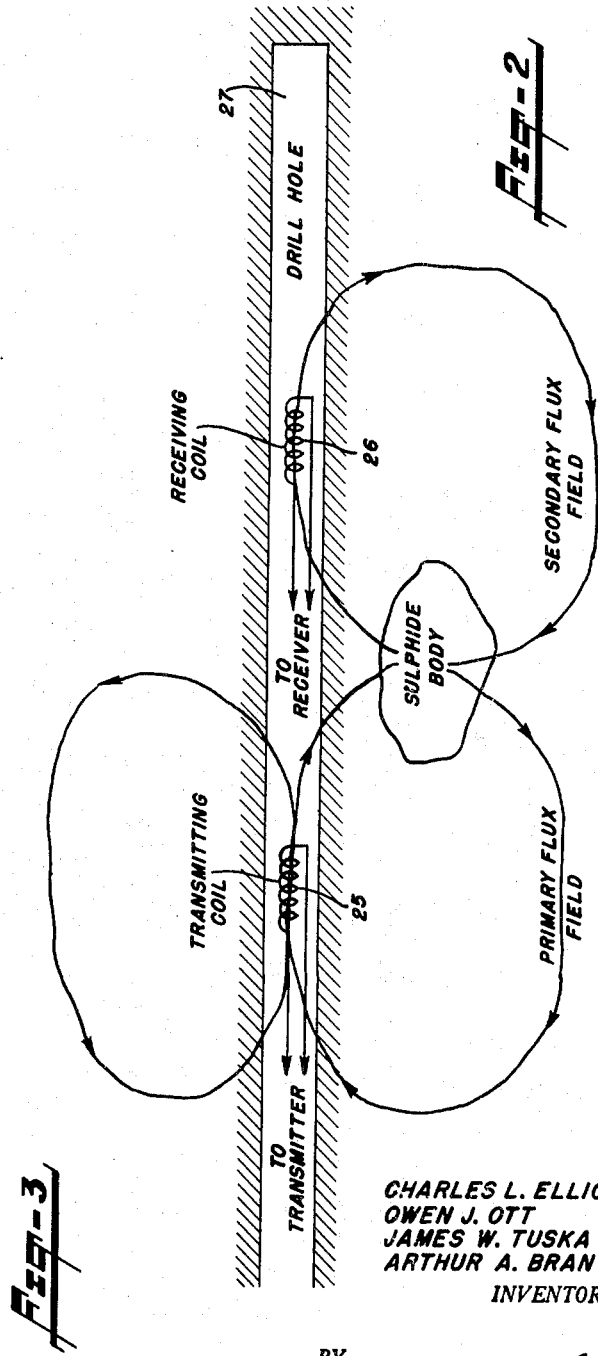
CHARLES L. ELLIOT
OWEN J. OTT
JAMES W. TUSKA
ARTHUR A. BRANT
INVENTORS
BY
*Rudolph J. Jmick*
ATTORNEY

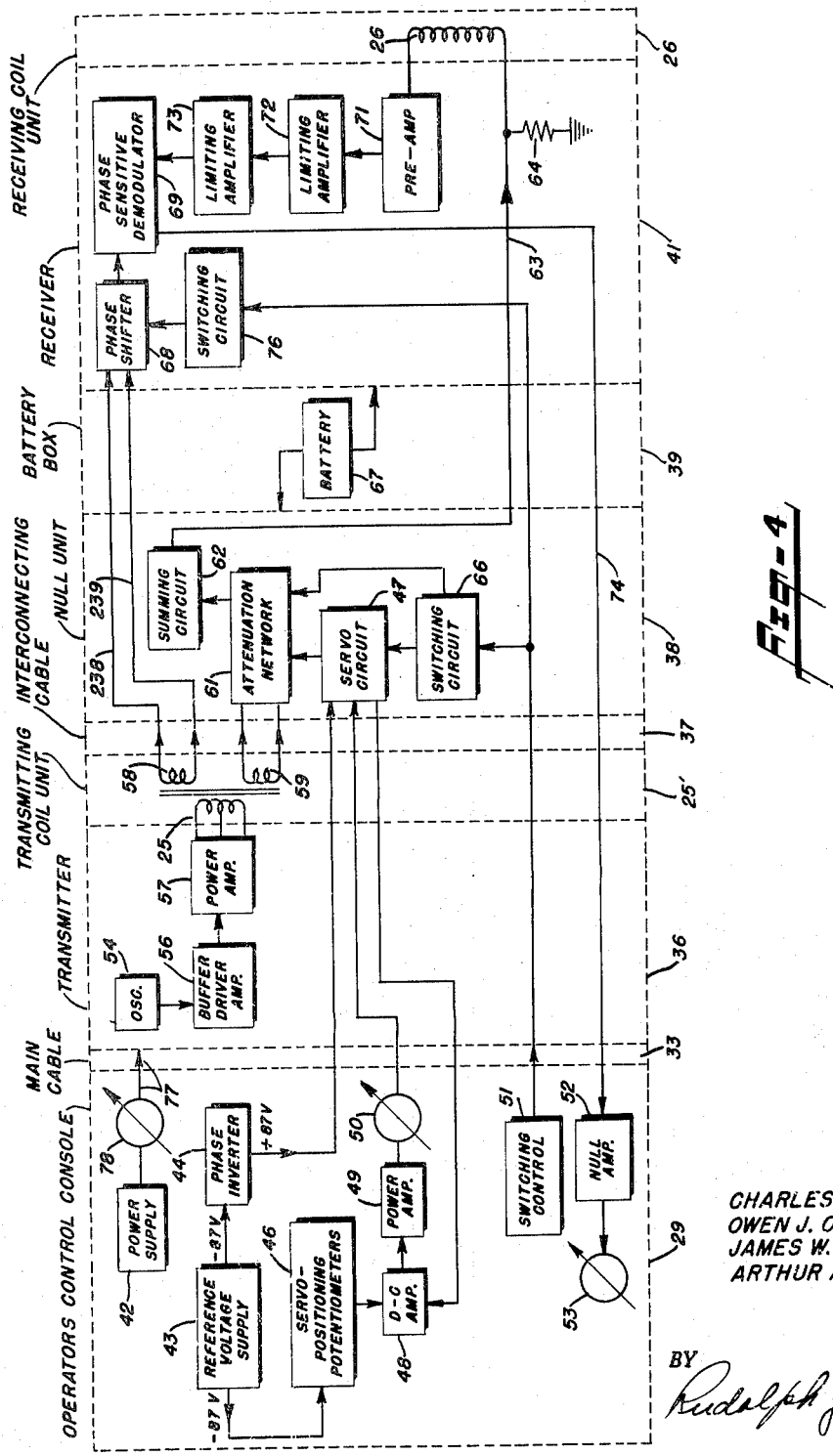

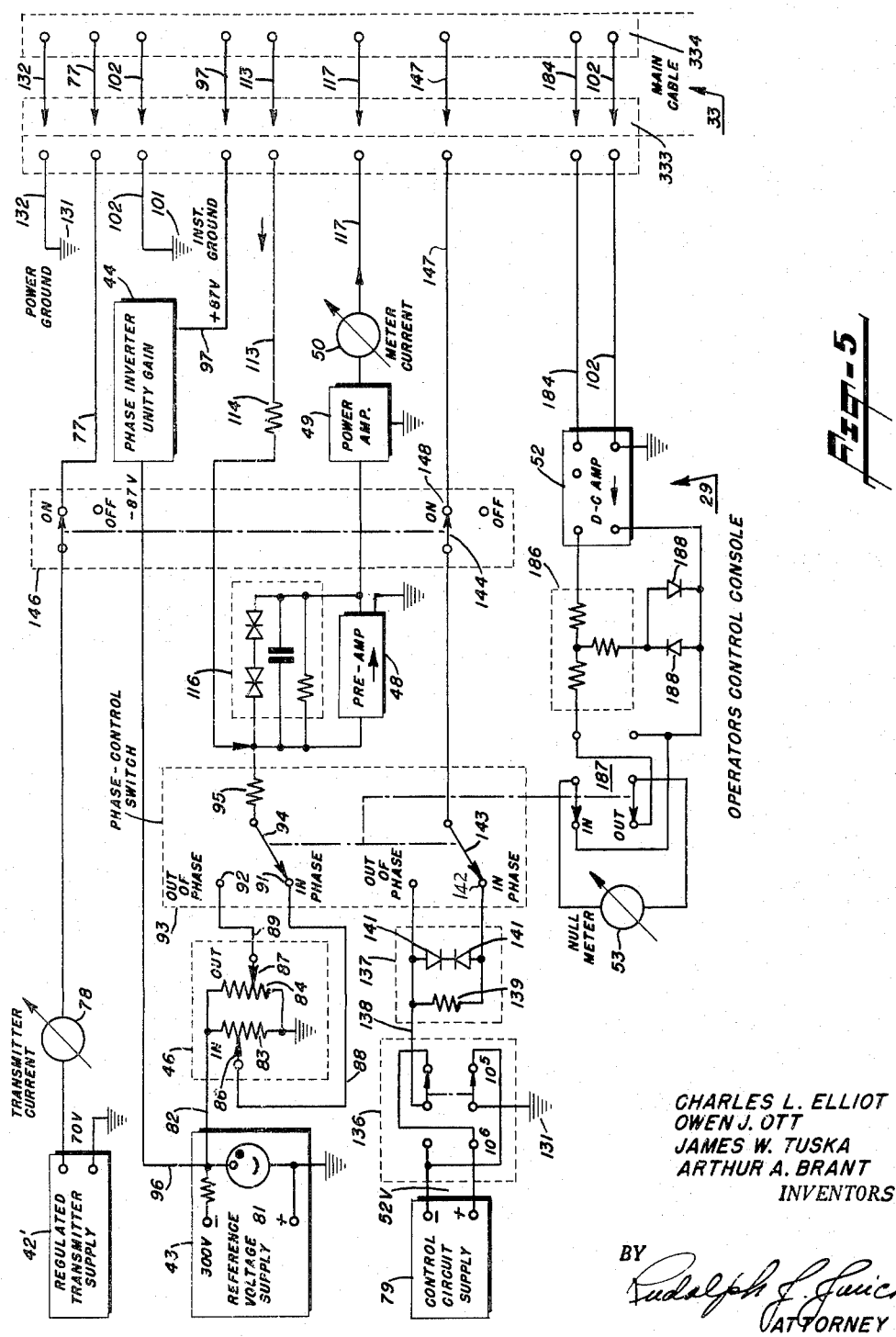

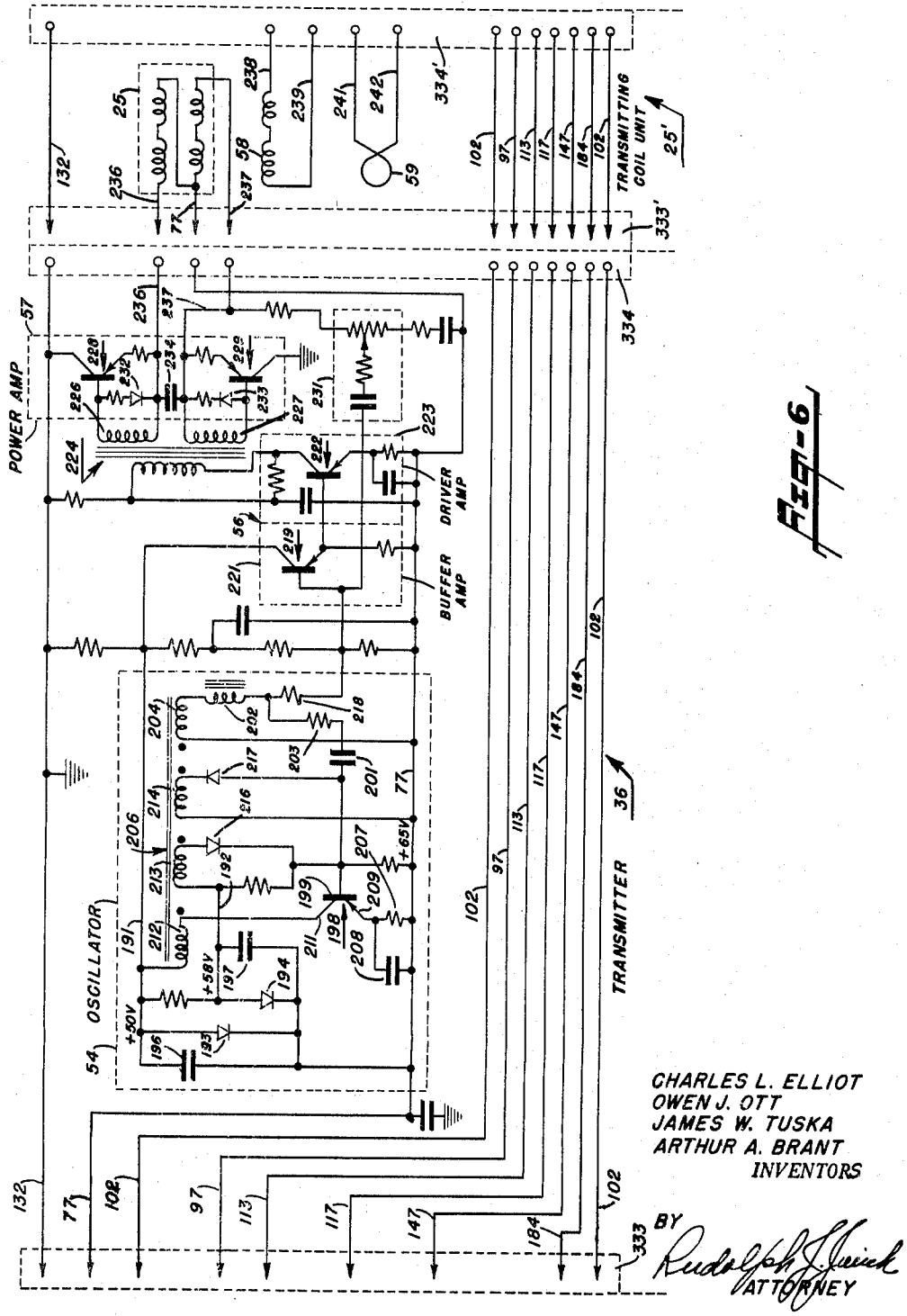

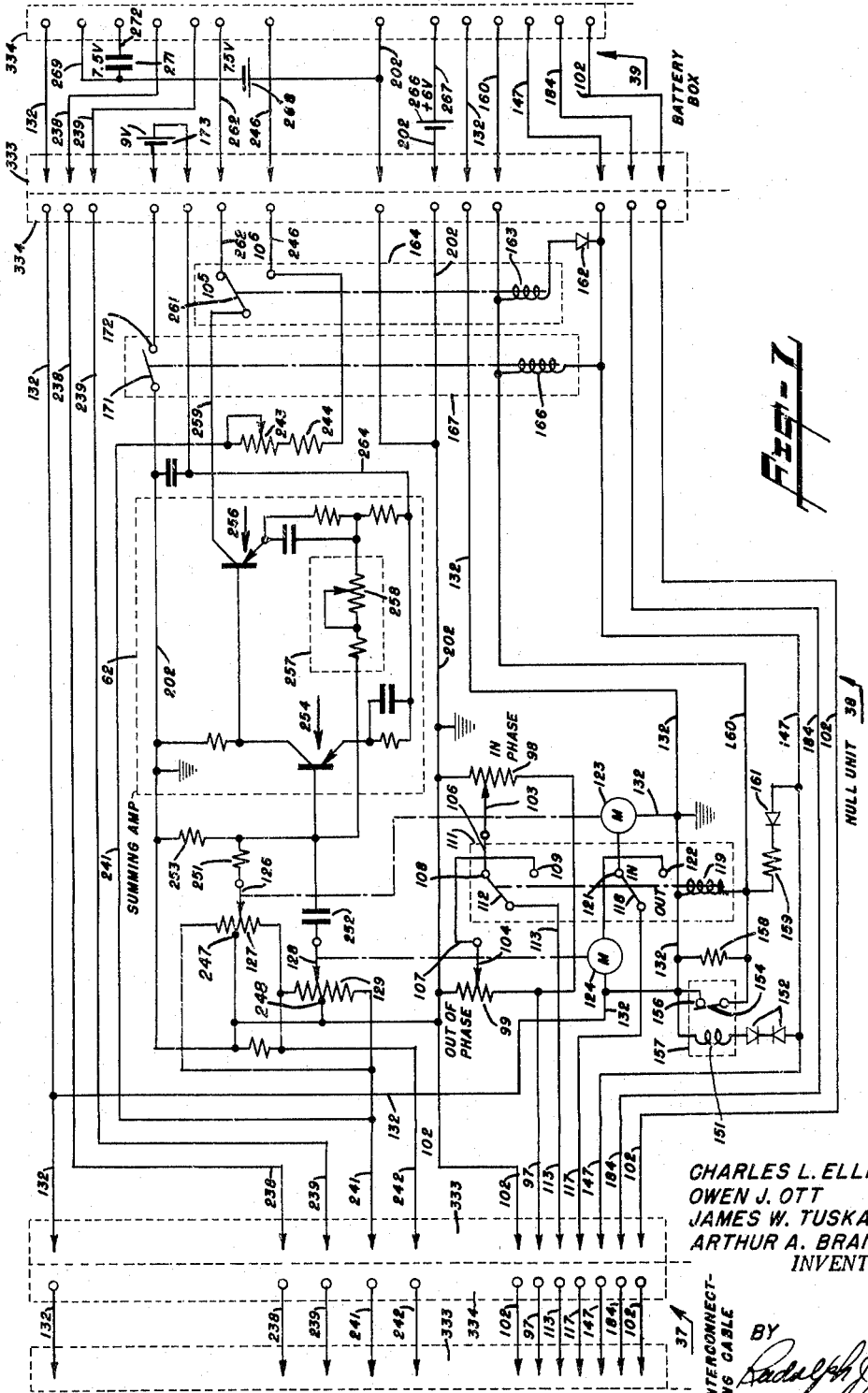

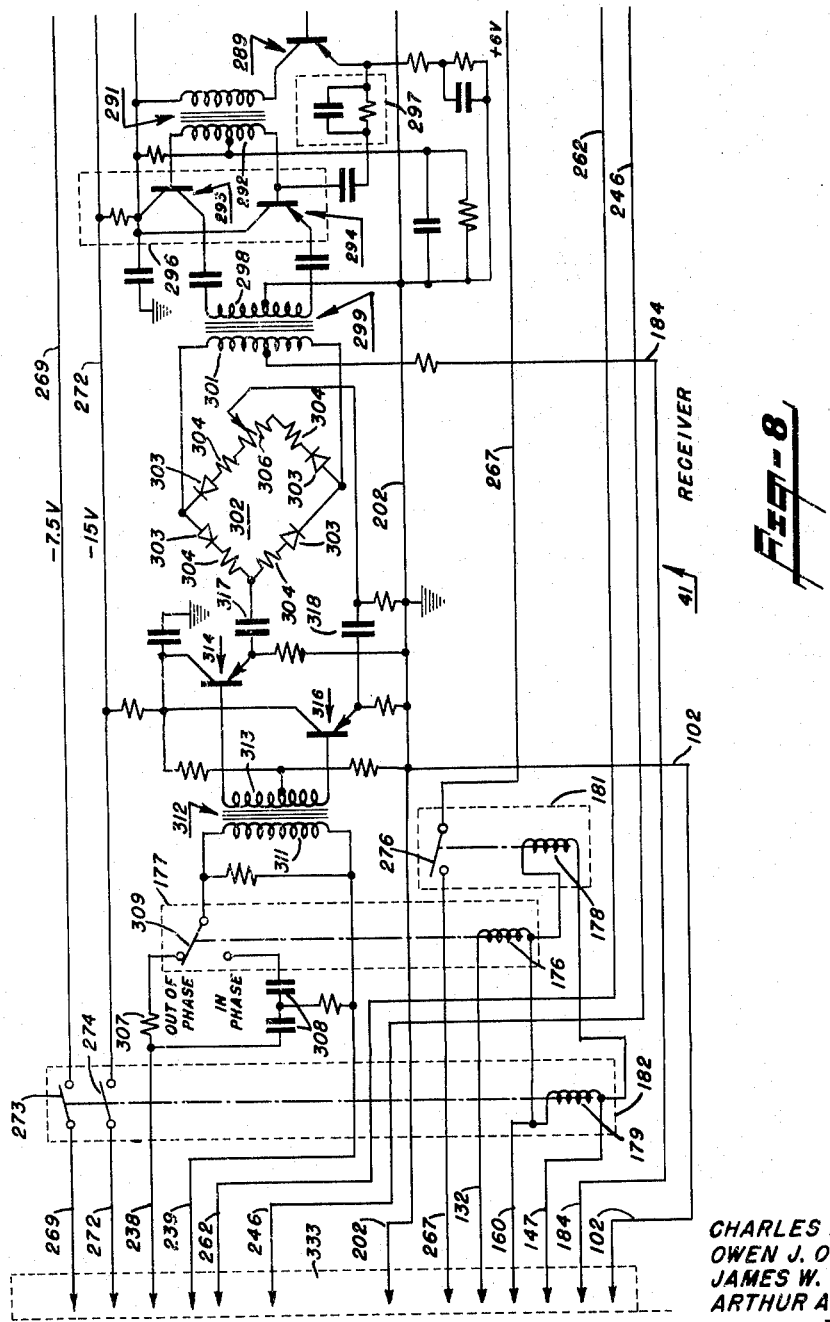

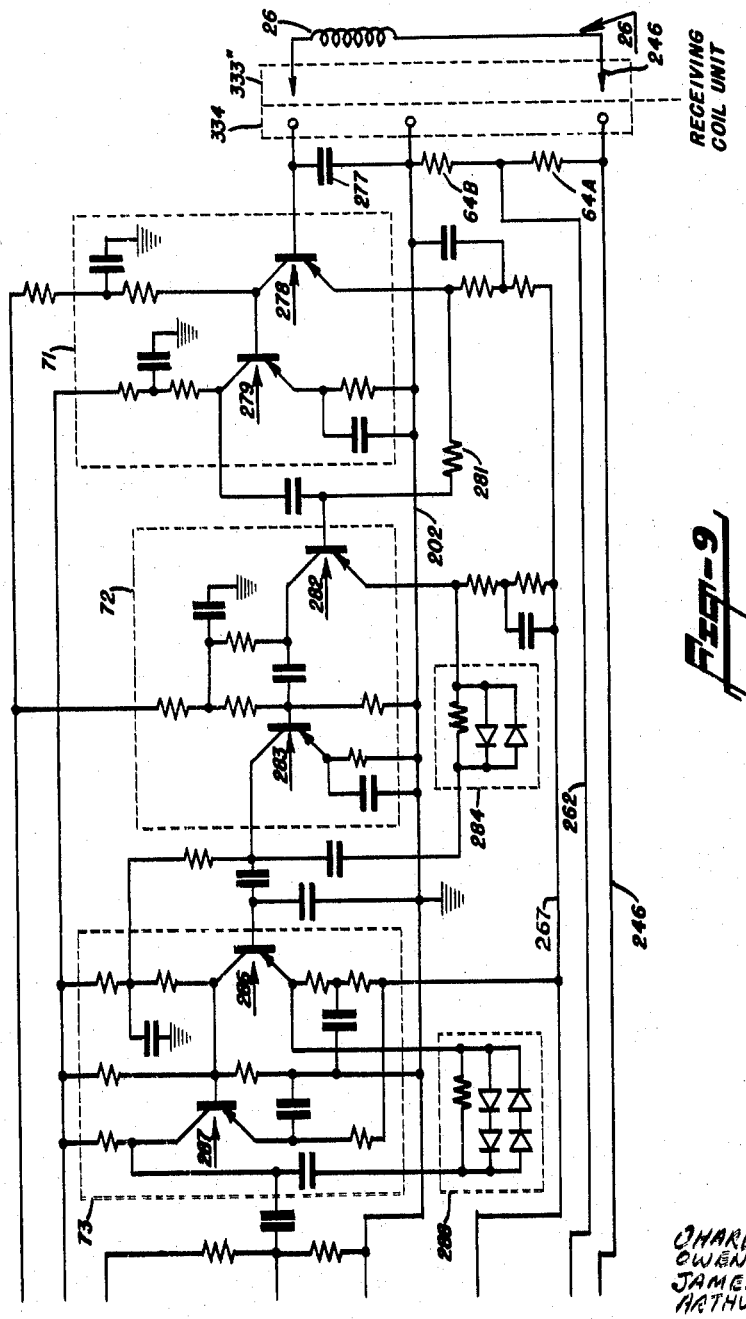

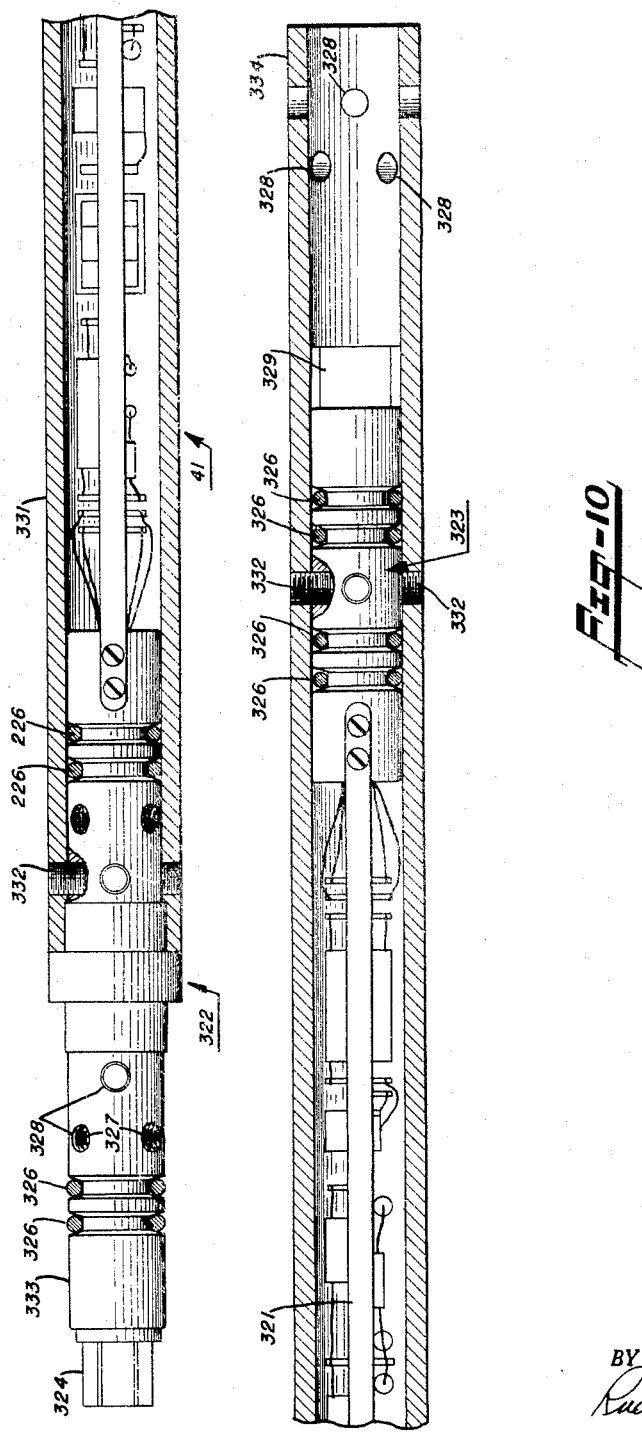

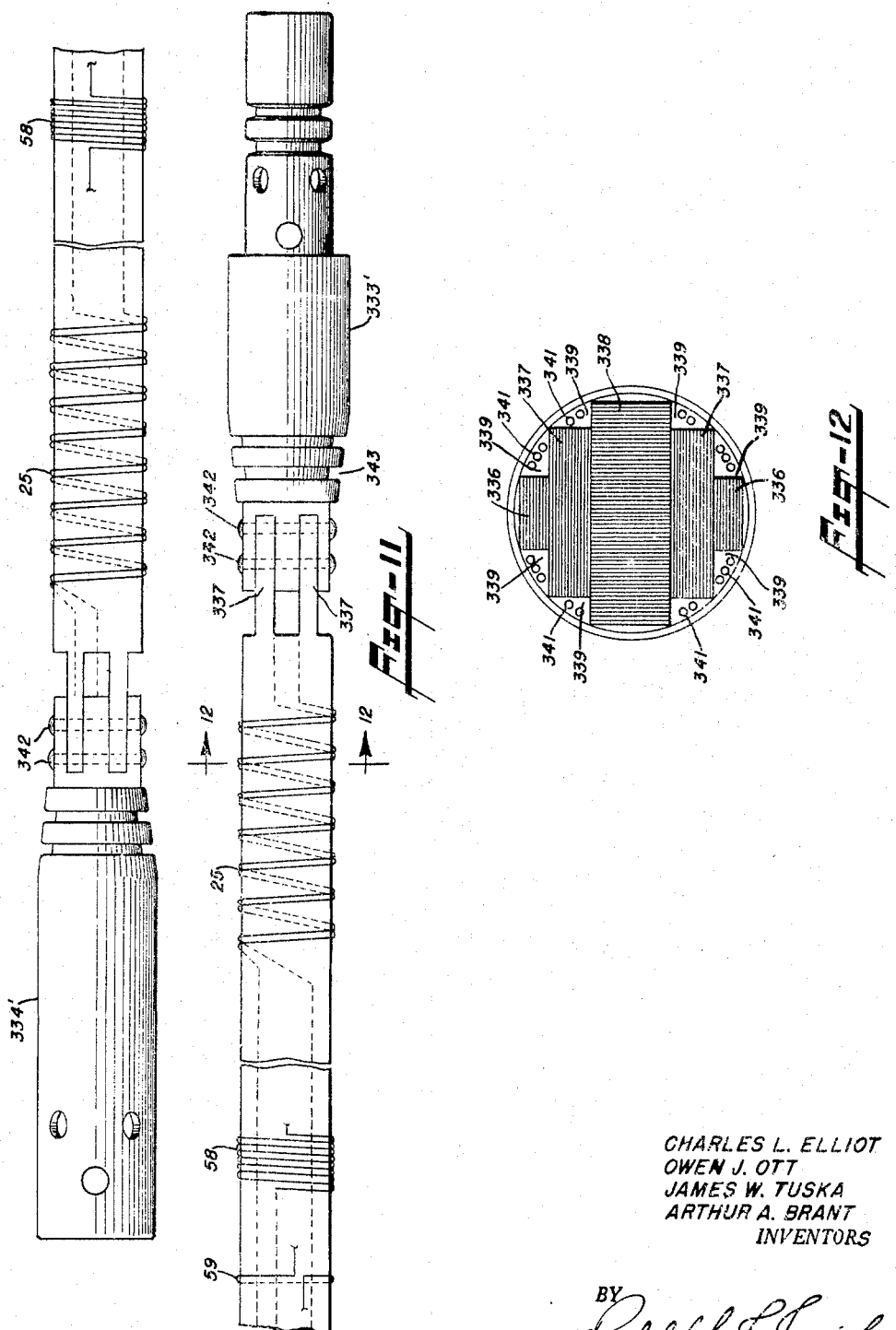

Oct. 26, 1965     C. L. ELLIOT ETAL     3,214,686
DRILL HOLE ELECTROMAGNETIC METHOD AND APPARATUS
FOR GEOPHYSICAL EXPLORATION UTILIZING IN-PHASE
AND OUT-OF-PHASE NULLING VOLTAGES
Filed Sept. 6, 1960     11 Sheets-Sheet 11
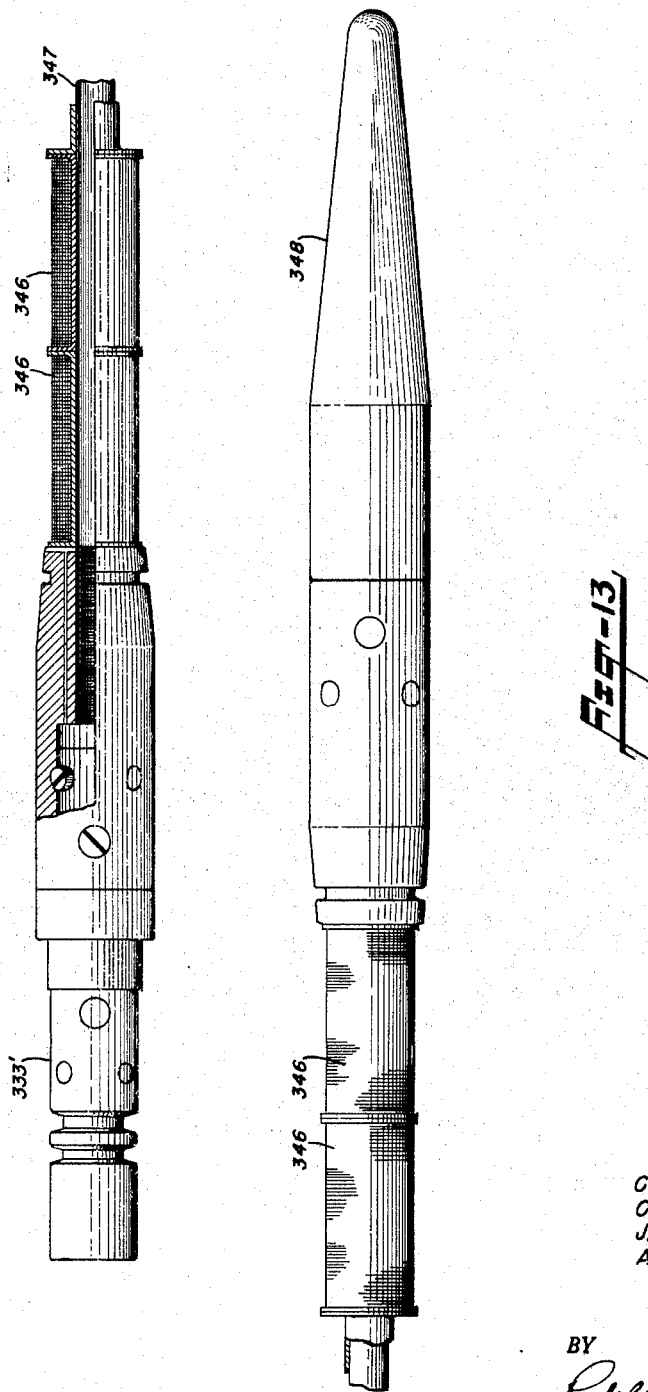
CHARLES L. ELLIOT
OWEN J. OTT
JAMES W. TUSKA
ARTHUR A. BRANT
        INVENTORS
BY
        ATTORNEY

United States Patent Office

3,214,686
Patented Oct. 26, 1965

3,214,686
DRILL HOLE ELECTROMAGNETIC METHOD AND APPARATUS FOR GEOPHYSICAL EXPLORATION UTILIZING IN-PHASE AND OUT-OF-PHASE NULLING VOLTAGES
Charles L. Elliot, Danbury, and Owen J. Ott, Brookfield, Conn., James W. Tuska, Franklin Park, N.J., and Arthur A. Brant, Ridgefield, Conn., assignors to Newmont Mining Corporation, New York, N.Y., a corporation of Delaware
Filed Sept. 6, 1960, Ser. No. 53,936
12 Claims. (Cl. 324—6)

This invention relates to apparatus and method for use in geophysical exploration and more particularly to apparatus and method for use in drill hole electromagnetic-induction exploration to determine the presence, location, size, shape and electrical properties of buried bodies containing electrically conductive sulfides.

In geophysical exploration work electromagnetic logging of bore holes has been commonly used and is a well known art, particularly in prospecting for petroleum. However, the method and apparatus described in this application are especially adapted for mineral exploration work in drill holes. Further, while our invention is described as used in a drill hole, it can be readily seen that this method and the apparatus could also be readily adapted to mineral exploration work utilizing surface or airborne measurements.

In oil exploration, using the electromagnetic method in bore holes, the prime interest is in measuring the electrical properties of rock formations in the near vicinity of the bore hole in order to obtain the location of rock formation contacts and to obtain an indication of the rock type in the formation. The equipment used to obtain this information is specifically designed for this purpose and is capable of operation in conventional oil bore holes which are normally 6 inches to 8 inches in diameter and are vertical or nearly vertical in inclination and drilled from the earth's surface. In order to measure the conductivities of the formations which are normally in the range of $10^{-3}$ to $10^{-1}$ mhos per meter, it is necessary for the equipment to operate at a relatively high frequency in the order of several thousands of cycles per second and normally the order of 10,000 cycles per second. Also, to obtain true measurements of the conductivity of the formation only in the near vicinity of the borehole, the spacing between transmitter and receiver coils is the order of only a few feet, i.e., less than 30 feet. Thus, oil well surveying equipment is specifically designed to penetrate only a few feet into the wall rock and, therefore, cannot detect even a perfectly conducting body located only tens of feet away from the borehole.

In comparison, in mining drill hole exploration methods, the desire is to locate and delineate conducting sulfide bodies positioned laterally and away from the drill hole. At the same time, the effects of the rock formations in the near vicinity of the drill hole are not desired as this is usually known from visual inspection of the core obtained during the drilling of the hole as is customarily done in mining exploration. Thus, it is necessary for the method and apparatus to minimize the effects of changes in the wall formations of the hole while accentuating the effects obtainable from remote laterally positioned sulfide bodies.

Most conductive bodies which are of economic interest in mining have conductivities in the range of $10^0$ to $10^2$ mhos per meter compared with background rock conductivities of $10^{-3}$ to $10^{-1}$ mhos per meter. In order to meet these conditions, it is necessary for mining exploration equipment to operate with a frequency between a few hundred and a few thousand cycles per second with frequencies the order of a 1000 cycles per second the most common and with spacings between the transmitter and receiver coils between 50 and 200 feet, with 100 feet the most common.

The diamond drill holes encountered in mining exploration may be as small as 1.5 inches in diameter with the largest normally 3.0 inches in diameter. Also, it is customary that mining exploration drill holes may be inclined at any angle relative to the horizontal, even above horizontal, and besides being drilled from the earth's surface, they may also be drilled from underground mine openings. Therefore, the apparatus must be capable of insertion in holes of these small diameters and random inclinations.

By a comparison of the above oil and mining requirements, it is apparent that it is impossible in mining applications to use the apparatus and techniques of the oil exploration art and thus new approaches in methods and apparatus are very necessary.

In performing geophysical exploration in a drill hole for conductive sulfide bodies, it is desired to obtain the following information:

(1) To detect the presence of conductive sulfide bodies laterally of the drill hole to as far a distance away as is feasible;

(2) To determine the approximate size and form of the disclosed sulfide body;

(3) To determine the approximate strike and dip or spatial attitude of the disclosed sulphide body relative to the drill hole; and (4) To determine the average electrical properties of the disclosed sulfide body.

An object of this invention is to provide a method by which the above information can be obtained, utilizing apparatus of such a design that this can be readily carried out. As is commonly necessary in most geophysical applications, the method and apparatus must be of such a nature that the work may be carried out in a rapid, efficient and economical manner while working often under adverse conditions of weather, terrain, or accessibility. Further, and perhaps most important, the method and apparatus must have inherently the required sensitivity, stability and dependability to accomplish the above aims.

Most electromagnetic methods of geophysical prospecting, whether airborne, ground or drill hole, have in common the use of a transmitter and receiver normally separated from each other by a distance which may be fixed or variable. The transmitter employed in apparatus for such electromagnetic prospecting consists of a means of generating an alternating current of an audio frequency which is caused to flow in a primary or transmitting coil. This coil and its associated circuitry are so designed that a large primary magnetic flux field is thus generated by the alternating current flowing in the transmitting coil, and this primary magnetic field propagates outward from the coil into the surrounding air and rock formations. If a sulfide body of reasonable size and electrical conductivity is located within the effective propagation range of the primary magnetic field, then it will have eddy or secondary currents induced in it in accordance with the principles of electromagentic induction. These eddy currents will be of the same frequency as the primary magnetic field but will bear a time or phase relationship to the primary field which will depend on the physical and electrical characteristics of the conductive sulfide body. A secondary or anomalous magnetic flux field will be thus generated by these eddy currents and, in like manner, to the primary field it will propagate outwardly from the causative body into the surrounding rock formations.

Prior art receivers often comprise a receiving coil, an audio voltage amplifier and a voltage measuring or indicating system. The receiving coil will have voltages induced in it by the primary and secondary magnetic fields and these signals will bear an amplitude and phase relationship to the primary magnetic field. These induced signals are then amplified in the high gain audio frequency amplifier to a sufficient magnitude to render them measurable. The characteristics of these signals are then derived in a suitable fashion in the indicating system. The voltage indications thus obtained can be used to describe the character of the magnetic fields at the position of the receiving coil and a comparison of these indications can be made as one or both of the coils are moved from point to point. In the absence of a conductive sulfide body only the primary field will be present at the receiving coil whereas in the presence of a conductive sulfide body both the primary and secondary magnetic fields will be present. Thus, a means is available for indicating the presence of the sulfide body and, by using the art of geophysical interpretation, the physical and electrical characteristics of the sulfide body may be derived.

Previous patents of drill hole electromagnetic apparatus and methods (for example, #2,874,348, A. A. Brant et al., February 17, 1959, and #2,746,009, G. H. McLaughlin et al., May 15, 1956, etc.) used a common system in which the receiver is moved in the drill hole from station to station while the transmitter remains at the collar of the hole. The transmitting coil normally comprises a large vertical coil with a high alternating current flowing in it to thus create a large magnetic moment.

Most previous systems employ null reading instruments in which the plane of the transmitting coil is tilted in order to tilt the direction of the resultant of the primary and secondary fields at the receiving coil so that no signal is induced in the receiving coil. Thus, the change in the tilt of the transmitting coil at the signal null is indicative of the presence of a secondary field and consequently indicates the presence of a conductive sulfide body near the receiver in the drill hole.

Other previous systems directly measure the relative change in the magnitude of the resultant magnetic field at the receiving coil or its phase relationship to the primary field. Thus, indications of conductive sulfide bodies are derived from noting changes in the amplitude or phase of the resultant magnetic field as the receiver is moved along the drill hole past the body. In this group of previous electromagnetic drill hole systems, several variations have been used. Instead of a vertical loop transmitting coil, some have used a very large horizontal loop set on the ground surface with the drill hole at its center. Other systems have used a transmitting coil in one hole while the receiving coil is in an adjacent hole and both are moved together from point to point in the holes.

It is readily apparent from the above brief descriptions of previous drill hole electromagnetic systems that they have one or more of the following limitations:

(1) By measuring only the relative change in the amplitude or phase of the resultant magnetic field, only the presence of a conductive sulfide body can be derived. Therefore, the physical parameters of size, shape and spatial attitude, and the electrical parameter of conductivity are not derived and it is thus not possible to differentiate between desired and undesired conductive bodies.

(2) By changing the position of the receiving coil in the drill hole for each station reading while the transmitting coil remains in a fixed position, the separation between the coils continually varies. Thus, the physical conditions for each reading are altered so that a direct comparison of consecutive readings is not possible.

(3) Also, by increasing the separation for each reading the primary field is less at each consecutive station and ultimately falls below a workable and useful level. Therefore, there is a maximum depth limit under which these systems can operate.

(4) Also, by increasing the separation for each reading the primary magnetic field becomes more distorted as it propagates through the rock formations for large distances which distortion is caused by insignificant but commonly occurring minor changes in conductivity of the surrounding rock formations.

(5) If a good conductive body should lie at a depth in the hole, it would preclude operation of these systems below the conductive body, as the primary field would be largely attenuated by it, thus creating a shielding effect between the transmitter and the receiver.

(6) If the drill hole deviates with depth from its prescribed inclination or position, then undesired anomalous signals are created which might falsely indicate the presence of a conductive sulfide body.

(7) Normally, in mining exploration, drill holes are not drilled in a regular pattern so that commonly there would not be adjacent holes for use in methods where the transmitter is lowered in one hole while the receiver is lowered in an adjacent hole.

(8) The large transmitting loops that are necessary to obtain sufficient depth penetration are difficult to handle in rough terrain or to lay out on the ground surface in the case of the large horizontal coil.

(9) Also, the use of large loops underground in mine openings is exceedingly difficult where only limited access or space at the drill hole collar is available.

(10) Normally underground in mine openings there are inevitably present such metallic objects as electrical cables, pipes, steel track, etc., near the drill hole collar and these seriously distort the primary magnetic field, thus causing undesirable anomalous effects.

These limitations on previous drill hole electromagnetic systems, as described above, seriously reduce the effectiveness of geophysical exploration utilizing this method. It will be shown below that our invention overcomes the above difficulties and is an appreciable improvement over heretofore used drill hole electromagnetic systems.

The present invention incorporates a method and an apparatus for geophysical surveying in small mining exploration drill holes using the principles of electromagnetic induction. The prime purpose of the method and apparatus is to locate and determine the physical and electrical characteristics of conductive sulfide bodies in the vicinity of the drill hole as a means of economically exploring for these bodies.

To accomplish this aim, the system of equipment comprises a transmitter and receiver which are rigidly coupled together so that the system as a whole may be moved in a drill hole with measurements taken at discrete points along the entire length of the drill hole. The equipment is so designed that it comprises various units which are separable into convenient packages for handling and transporting. These separate units include electronic circuitry, electrical cables, and coils, and are so designed to have necessary strength and waterproof characteristics. Means are provided to couple these several units together to provide mechanical and electrical coupling while also sealing them against water entry. Each unit has an outside diameter of 1.312 inches so that the equipment may be used in drill holes as small as 1.5 inches in diameter which are commonly found in mining exploration work. Also, means are provided where holes may be surveyed regardless of inclination from the horizontal wherein gravity feed is used for holes approaching a vertical direction and slit rods as disclosed in United States Patent No. 2,653,990, A. A. Brant, September 29, 1953, are used to propel the instrument in and out of holes in which gravity feed cannot be utilized while allowing for the enclosing of the necessary electrical cable inside the rods.

The illustrated system operates at a frequency of 1230 cycles per second for detecting the presence of a sulfide body and furnishing data from which the physical and electrical parameters of the sulfide body may be derived. It will be understood that the frequency used may be in the range of from, say, several hundred to several thousand cycles per second, with frequencies on the order of 1,000 cycles being commonly used for measurement of the conductivity of rock formations. Although the precise frequency of operation is not critical, recitation in the claims of a flux field having a frequency of approximately 1,000 cycles per second is intended to clearly distinguish from oil exploration methods and apparatus which generally utilize signal frequencies on the order of 10,000 cycles per second. The system measures the components of the anomalous secondary magnetic field and the components measured are the in-phase (0° or 180° phase angle with respect to the primary field) and the out-of-phase or quadrature (90° or 270° phase angle with respect to the primary field). The equipment is capable of measuring these components from $\pm 10^2$ to $\pm 10^5$ in parts per million of the primary field with a resolution of $\pm 10^2$ p.p.m. and on a less sensitive range from $\pm 10^3$ to $\pm 10^6$ p.p.m. with a resolution of $\pm 10^3$ p.p.m.

The basic system comprises two coaxial coils, the transmitting and the receiving coil, with their common axis parallel to the axis of the drill hole and with a spacing of 100 feet between their respective electrical centers. The transmitting coil has a high magnetic permeability core to increase its magnetic moment while the receiving coil is air cored.

The transmitter consists of an oscillator-amplifier circuit which is feedback stabilized and capable of supplying approximately 8 watts of power at a frequency of 1230 cycles per second to the transmitting coil. The magnetic flux thus created in the transmitting coil is propagated outward as the primary magnetic field.

Two reference windings are inductively coupled to the transmitting coil which supply reference voltages that are used as follows: (1), a reference voltage that is phase shifted by selection to be an in-phase reference or an out-of-phase reference to supply a carrier signal to a phase-sensitive demodulator in the receiver. (2), a reference voltage which is divided into three separate signals, each of which is appropriately attenuated and phase-shifted for (a) cancelling the primary field as received at the receiving coil (b) cancelling the in-phase component of the secondary anomalous field as received at the receiving coil, and (c) cancelling the out-of-phase component of the secondary anomalous field at the receiving coil. These three signals, after proper attenuation, are mixed together and their sum signal is subtracted from the received signal in the receiving coil.

The signal for cancelling the primary field signal has constant attenuation while the in-phase and out-of-phase cancelling signals pass through variable calibrated attenuators. These attenuators are varied by means of motor-driven potentiometers whose positions are controlled by servo feedback systems with control inputs at the operator's console located outside of the drill hole. The operator uses the calibrated positions of the servo control potentiometers at the console to determine the position of the downhole potentiometers and thereby the magnitudes of the in-phase and out-of-phase components of the secondary anomalous field at the receiving coil. This is accomplished by exactly balancing the amount of attenuated cancelling signals subtracted from the received signals to reach a zero signal condition in the output of the receiving coil system.

Signals resulting from imperfect cancellation of the received in-phase and out-of-phase signals in the receiving coils are amplified by a high gain non-overloading amplifier and fed into a phase sensitive demodulator with the appropriate phase reference carrier input. The D.C. voltage demodulator output is transmitted up the cable to the operator's console and after amplification it is visually displayed on a null meter. Thus, the operator has a means of exactly balancing the in-phase and out-of-phase signals which are indicated on the null meter.

To minimize the number of wires that are necessary in the main cable running down the drill hole from the operator's console to the drill hole circuitry, a switching system is incorporated. The switching system comprises relays, diodes, and Zener diodes so that the magnitude and polarity of the control voltage signals will accomplish the following switching operations:

(1) Power off-on for the receiver.
(2) Selection of the operating sensitivity range.
(3) Selection of in-phase or out-of-phase servo motor control and demodulator reference.

Also, to minimize the number of wires in the main cable, a set of four wires is used to control the servo motor system for each channel, so that the same set is used for both by alternately switching them from channel to channel as either the in-phase or out-of-phase component is adjusted.

An object of this invention is the provision of a drill hole geophysical prospecting method and apparatus for detection of the presence of a conductive sulfide body in the vicinity of the drill hole by means of measurement of the in-phase and out-of-phose components of the secondary magnetic flux field and from which it is possible to obtain quantitative data through the art of geophysical interpretation that results in knowledge of the shape, size and electrical conductivity of the causative conductive sulfide body and its distance from the drill hole.

An object of this invention is the provision of apparatus and method for use in geophysical exploration in which the in-phase and out-of-phase components of the secondary anomalous magnetic field are directly measurable over a wide range of values and with a high degree of resolution.

An object of this invention is the provision of apparatus and method for drill hole geophysical prospecting in which the transmitting and receiving coils are both propelled in a drill hole of arbitrary orientation while they are mutually coupled together and both are coaxial with the drill hole and separated by a fixed distance of considerable length, say, 100 feet.

An object of this invention is the provision of an apparatus for accomplishing the above objects and advantages comprising miniaturized electronic circuitry which may be used in drill holes as small as 1.5 inches in diameter and of any arbitrary inclination relative to the horizontal.

An object of this invention is the provision of a drill hole electromagnetic exploration apparatus which includes transmiting and receiving coils separated at a fixed large distance, and novel servo system means for remotely varying an attenuator in the drill hole portion of the apparatus.

An object of this invention is the provision of an apparatus for use in making geophysical explorations along a drill hole which apparatus includes a remote switching means for switching from outside the drill hole various functional controls in the apparatus within the drill hole using a minimum number of signal wires and which means includes diodes, Zener diodes and relays.

An object of this invention is the provision of a transmitting coil for use in a drill hole which includes a core of ferrous material to increase the magnetic moment of the coil and to also act as a strength member.

An object of this invention is the provision of a novel waterproof coupling for coupling together components of drill hole prospecting apparatus.

These and other objects and advantages of the invention will become apparent from the following detailed description when taken with the accompanying drawings. It will be understood that the drawings are for purposes of illustration and are not to be construed as defining the scope or limits of the invention, reference being had for the latter purpose to the appended claims.

In the drawings wherein like reference characters denote like parts in the several views:

FIGURE 2 is a longitudinal sectional view through a drill hole and illustrates the primary field generated by the transmitting coil and the secondary anomalous field generated by the eddy currents induced in the conductive sulfide body;

FIGURE 3 is a longitudinal sectional view through an underground drill hole and illustrates the physical assemblage of our apparatus;

FIGURE 4 is a circuit block diagram of the entire electronic circuitry;

FIGURE 5 is a schematic diagram with portions in block diagram form, of the electronic circuitry in the operator's control console, and including a schematic diagram of the main drill hole cable;

FIGURE 6 is a schematic circuit diagram of the transmitter unit, and the connected transmitting coil;

FIGURE 7 is a schematic circuit diagram of the interconnecting cable, null unit, and battery box;

Figure 1:
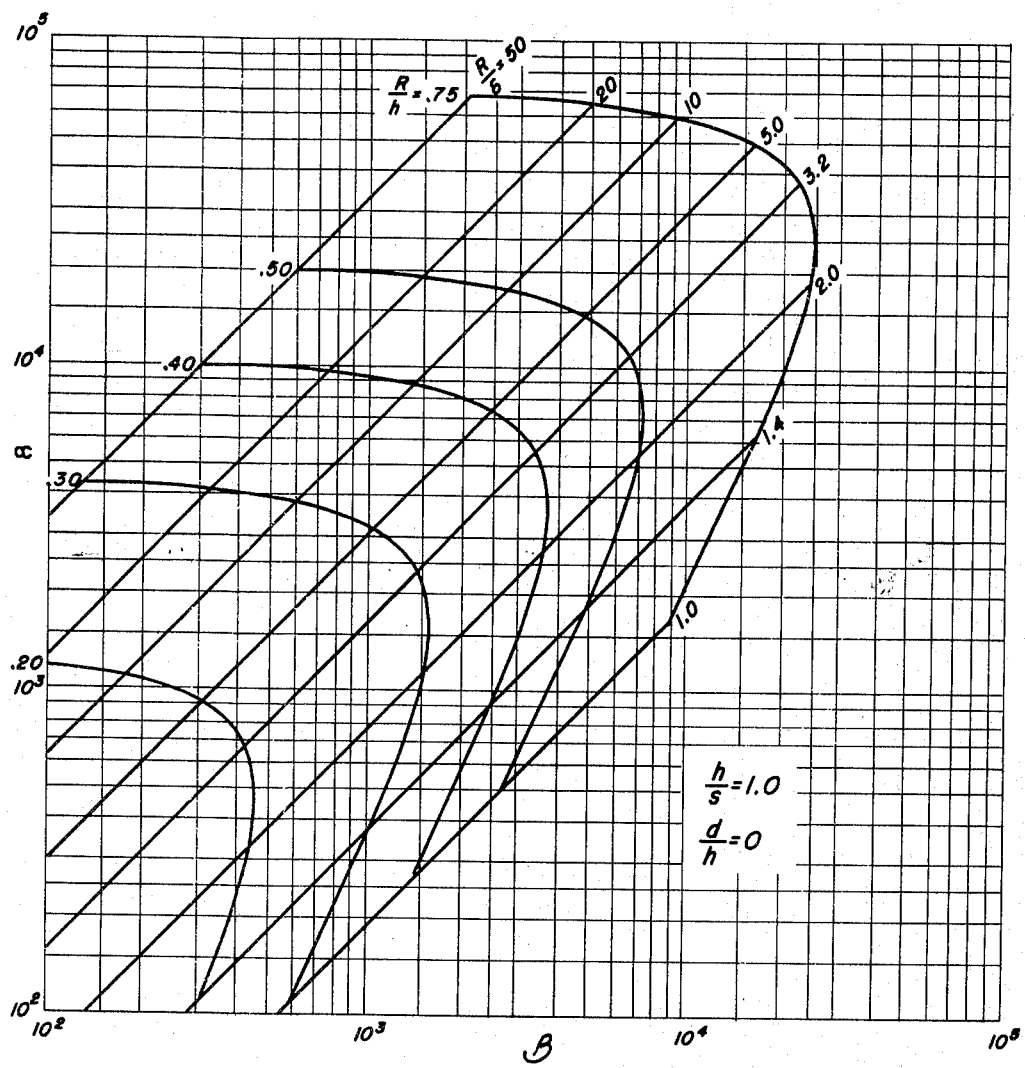
FIGURE 1 is a family of curves showing the secondary anomalous response of a sphere and illustrates the means by which successful geophysical interpretations of data from our invention can be obtained.

FIGURES 8 and 9 conjointly show a schematic circuit diagram of the receiver unit and receiving coil;

FIGURE 10 is a fragmentary sectional view of the receiver unit;

FIGURE 11 is a fragmentary side view showing the mechanical construction of the transmitting coil unit without encapsulation;

FIGURE 12 is a cross-sectional view taken on line 12—12 of FIGURE 11; and

FIGURE 13 is a fragmentary side view of the mechanical construction of the receiving coil, with parts shown broken away for clarity.

FIGURE 1

Reference is first made to FIGURE 1 which is a family of curves showing the secondary anomalous response of a spherical conductive body for our system of measurement. The terms used in this figure are defined as follows;

$s$ = the axial distance of separation between the transmitting and receiving coils in meters $h$ = the perpendicular distance from the center of the sphere to the axial line through the coil centers in meters $R$ = radius of the sphere in meters $d$ = the distance from the mid point between the coils to the point on the axial line of the coils directly above the center of the sphere in meters $\delta$ = the electrical skin depth in meters which can be expressed mathematically by $$\delta = \left[\frac{2}{\mu\omega\sigma}\right]^{1/2}$$

where $\mu$ = the magnetic permeability of the body and is normally that of free space so that $\mu = \mu_0 = 4\pi \times 10^{-7}$ henries per meter $\omega$ = the angular frequency of the electromagnetic field and is expressed mathematically by $\omega = 2\pi f$ radians per second where $f$ = the frequency in cycles per second $\sigma$ = the electrical conductivity of the conductive body in mhos per meter $\alpha$ = the in-phase component of the secondary anomalous magnetic field expressed in parts per million of the transmitted primary field $\beta$ = the out-of-phase component of the secondary anomalous magnetic field expressed in parts per million of the transmitted primary field.

Note that all quantities in FIGURE 1 are expressed in normalized or dimensionless form. For sake of example, all quantities are defined in accordance with the meter-kilogram-second (MKS) system, however, any consistent system of units may alternately be used.

The curves in FIGURE 1 are shown for a spherical conductive body for only one value of $h/s$. Obviously, other families of curves can also be derived for different values of $h/s$ and in a similar fashion for different conductive body shapes such as cylinders, disks, sheets, etc. The ranges of values plotted in FIGURE 1 are designed to handle the sizes and conductivities of bodies found in nature that are of economic interest at the frequencies customarily employed in electromagnetic prospecting.

It is apparent from this figure that knowing the magnitude of the in-phase ($\alpha$) and out-of-phase ($\beta$) components of the secondary anomalous magnetic field, and the magnitude of the normalized height of the coil system from the body center ($h/s$), it is possible to uniquely determine the radius ($R$) and conductivity ($\sigma$) of the body. From the field profiles of in-phase and out-of-phase response, the shape of the body and the value of $h/s$ is derived by superposition of the profiles with theoretically or model derived profiles for various body shapes and values of $h/s$. Then the appropriate diagram similar to FIGURE 1 is selected, and at the intersection of the $\alpha$ and $\beta$ at the peak response point ($d/h=0$) values $R/h$ and $R/\delta$ are obtained. Knowing $h$ then $R$ is obtained from $R/h$ and thus knowing $R$ then $\delta$ is obtained from $R/\delta$. Then knowing $\mu$ (which is assumed to be that of free space) and $\omega$ a solution for $\sigma$ is obtained from the skin depth parameter ($\delta$). Thereby all of the desired physical and electrical parameters of the conductive body are derived from a knowledge of the $\alpha$ versus $d$ and $\beta$ versus $d$ curves which are obtained with our apparatus.

FIGURE 2

Reference is now made to FIGURE 2 which is a longitudinal section through a drill hole 27 and illustrates the primary field that is generated by the current flowing in the transmitting coil 25 and the secondary anomalous magnetic field that is generated by the eddy currents that are induced in the conductive sulfide body by the action of the primary fields. The current flowing in the transmitting coil has its source in the transmitter and the voltages induced in the receiving coil 26 are detected in the receiver after sufficient amplification. The vector directions indicated in the drawing represent instantaneous directions only and it is understood that the primary and secondary fields are actually time varying sinusoidal fields.

At distances large with respect to the dimensions of the transmitting coil, the primary magnetic field may be considered to be that due to a magnetic dipole situated at the center of the transmitting coil and oriented along the axis of the coil ($x$ direction). Thus, the primary magnetic field may be expressed mathematically by $$H_n = -\frac{d\Phi}{d_n}$$

where $\Phi$ is a potential function expressed by $$\Phi = \frac{M_1 I_1 x}{4\pi r^3}$$

and $$M_1 = \mu_1 N_1 A_1$$

At the receiving coil the voltage induced in it by a magnetic field is expressed by $$E_2 = -\mu M_2 \frac{dH_n}{dt}$$

and $$M_2 = N_2 A_2$$

so that at a separation ($s$) between the coils the voltage induced in the receiving coil with its dipole axis oriented in the x direction by the primary field is $$E_2 = -\frac{\mu \omega I_1 M_1 M_2}{2\pi s^3}$$

The quantities used are defined as follows:

$r$=a radius vector in meters so that $r^2 = x^2 + y^2 + z^2$ in a rectangular coordinate system $(x, y, z)$
$s$=the axial distance of separation between the transmitting and receiving coils in meters
$n$=an arbitrarily oriented unit vector in meters
$N_1$=the number of turns in the transmitting coil
$N_2$=the number of turns in the receiving coil
$A_1$=the cross sectional area of the transmitting coil in square meters
$A_2$=the cross sectional area of the receiving coil in square meters
$\mu$=the magnetic permeability of the medium and is normally that of free space so that $$\mu = \mu_0 = 4\pi \times 10^{-7} \text{ henries per meter}$$

$\mu_1$=the effective magnetic permeability of the core material in the transmitting coil which is dimensionless
$H_n$=the magnetic intensity component of a magnetic field in the n direction in amperes per meter
$E_2$=the induced voltage in the receiving coil in volts
$I_1$=the current flowing in the transmitting coil in amperes
$t$=time in seconds
$\omega$=the angular frequency of the electro magnetic field and is expressed by $\omega = 2\pi f$ radians per second where $f$=the frequency in cycles per second.

Similar expressions for the voltage induced in the receiving coil 26, due to the secondary anomalous magnetic field are obtainable, however, they normally are extremely complex and cannot be expressed conveniently in closed mathematical form. These expressions depend principally on the physical and electrical parameters of the conductive sulfide body and on the geometry of the coil systems relative to the body. In lieu of mathematical treatment of these complex secondary anomalous magnetic fields, normal response curves are obtained through electromagnetic scale modeling.

FIGURE 3

Reference is now made to FIGURE 3, which is a longitudinal sectional view through an underground drill hole 27 and which illustrates the physical assemblage of our apparatus. Although FIGURE 3 is drawn to illustrate the assemblage of our apparatus in a horizontal drill hole that has been drilled from an underground mine opening, it should be readily apparent that our apparatus can also be used in holes which have been drilled from the surface and/or at other inclinations from the horizontal. It is understood that when the holes are inclined near the vertical that gravity feed may be utilized for propelling the drill hole apparatus into the hole and thus the use of split drill hole rods above the unit will not be necessary.

The drill hole 27 has been drilled from the underground mine opening 28 and it may be of any commonly drilled size of diamond drill hole from 1.5 inches in diameter to 3 inches in diameter. In the mine opening are located the operators control console 29 and the cable reel 31 which contains a sealed slip ring assembly 32. The operators control console contains all switches, controls, and meters necessary for the proper operation of our apparatus. The cable reel holds the necessary cable for connecting to the drill hole units and is used for storing and transporting this cable. Contained within this cable reel is a slip ring assembly with 10 channels with which signal continuity to and from the cable conductors may be maintained while the cable is being fed out or drawn in and the cable reel is in motion. This unit has self contained features for sealing against water and moisture entry.

In the drill hole, a main cable 33 connects all electrical circuits from the reel to the drill hole units of our apparatus. This cable is contained within aluminum split drill hole rods 34 which are in 10 foot lengths and mechanically coupled togtther and to the drill hole units. These rods are the same as disclosed in U.S. Patent No. 2,653,990, A. A. Brant, September 29, 1953, which patent is incorporated by reference in this application. These rods are used to protect the main cable which is contained within while offering a means of mechanically propelling the drill hole unit in and out of the drill hole.

The transmitter unit 36 contains the electronic circuitry for generating the current which flows in the transmitting coil 25 within the transmitting coil section 25' and thus sets up the primary field. An interconnecting cable 37 carries all electrical circuits between the transmitter and receiver and it is also contained within aluminum split drill hole rods 34. A null unit 38 contains the electronic circuitry for nulling out the induced voltages in the receiving coil due to the primary and secondary anomalous fields. A battery box 39 contains all battery power for the null unit and receiver unit 41. The receiver unit contains the electronic circuitry for amplifying and demodulating the signals that are induced in the receiving coil 26 within the receiving coil section 26' by the resultant of the primary and secondary magnetic fields.

All of these units in the drill hole are so constructed to resist mechanical forces of abrasion, tension, compression, and torque and to permit sealing against water entry when submerged in the drill hole. Also, it is necessary that a fixed distance of, say, 100 feet, be rigidly and accurately maintained along the common axis between the electrical centers of the transmitting and receiving coils.

FIGURE 4

Reference is now made to FIGURE 4, which is a circuit block diagram of our apparatus. In this drawing, dashed lines indicate major subdivisions of the equipment while solid lines indicate a functional breakdown of the circuits into identifiable stages.

In the operators control console 29, a power supply 42 supplies all voltage requirements for the operators control console 29 and the transmitter unit 36. A reference voltage supply 43 for the servo control system is supplied to the downhole servo positioning potentiometers after passing through a phase inverter 44 and directly to the uphole servo positioning potentiometers 46. The sum voltage of the servo positioning signals received from a downhole servo positioning potentiometer included in the servo circuit 47 and an uphole servo positioning potentiometer 46 is amplified in a D.C. amplifier 48 and a power amplifier 49 and sent through a meter 50 downhole to a servo motor (in the servo circuit 47) as a motor drive signal. Switching controls 51 control the various remote switching operations of the downhole circuitry. The null signal received from downhole is amplified in the null amplifier 52 and displayed on the null meter 53.

The main cable 33 carries all signal leads from the operators control console to the downhole units of our apparatus. The reel and slip rings through which these signals pass, are not indicated in FIGURE 4.

In the transmitter unit 36 a signal of the desired frequency is generated in an oscillator 54 and amplified in a buffer-driver amplifier 56 and power amplifier 57. This signal then drives the transmitting coil 25 and results in the propagation of the primary magnetic field.

Two reference voltages are taken off by secondaries 58 and 59 inductively coupled to the transmitting coil 25, and all signals pass to the receiver end of our apparatus via the interconnecting cable 37.

In the null unit 38 one of the reference voltages from the pick-up coil 59 is split into three channels of the appropriate phase relationships and attenuated in an attenuation network 61. The separate signals after the desired attenuations are added together in the summing circuitry 62 and the sum signal is fed through a lead 63 and is developed across a resistor 64 in series with the receiving coil 26. Variable attenuators for the anomalous in-phase and out-of phase nulling circuits in the attenuation network 61 are controlled by servo motors and servo positioning potentiometers in the servo circuitry 47. Functional switching of the circuitry in this unit is accomplished by switching circuitry 66.

In the battery box 39 rechargeable batteries 67 supply all power requirements for the circuitry in the null unit 38 and the receiver unit 41.

In the receiver unit 41 the reference voltage from the transmitting secondary, or pick-up coil 58 is selectively phase shifted in a phase shifter 68 to bear a 0 degree or 90 degree phase relationship to the primary field. This signal is then sent to a phase-sensitive demodulator 69 as a carrier reference.

The sum signal of the voltages induced in the receiving coil 26 and the nulling signals developed across the series resistor 64 is amplified in a preamplifier 71 and non-overloading limiting amplifiers 72 and 73 and thence fed to the input of the phase-sensitive demodulator 69. The D.C. output of the phase sensitive demodulator 69 is sent up to the operators control console 29 through a lead wire 74 where it is further amplified by the null amplifier 52 and then displayed on the null meter 53. Functional switching of the circuitry in the receiver unit is accomplished by switching circuitry 76 also under control of the switching control circuit 51 in the operators control console 29.

The last unit in the drill hole is the receiving coil 26 in which are induced voltages under the effects of the various magnetic fields that are present at the coil position.

FIGURE 5

Reference is now made to FIGURE 5 which includes a schematic diagram with portions in block diagram form of the electronic circuitry in the operators control console. The power input to the operators control console 29 can be either 115 volts or 230 volts 60 cycles per second power by selection of appropriately wired power plugs. Secondaries of a main power transformer (not shown) furnish voltages necessary for a plurality of power supplies which are described as follows:

(1) A regulated transmitter supply 42' furnishes a regulated +70 volts which is the power source for the transmitter unit. It is sent downhole to the transmitter via lead wire 77 through a series milliammeter 78 for monitoring the total current drawn by the transmitter, the milliammeter providing a means of monitoring the operating state of the transmitter;

(2) A reference voltage supply 43 which furnishes a regulated —300 volts for operation of various amplifiers in the control console and for deriving an 87 volt reference for the servo system positioning potentiometers; and (3) A control circuit supply 79 which furnishes an ungrounded 52 volts for the remote control switching circuitry.

Other power supplies (not shown) furnish a regulated +27 volts and a —27 volts for the operation of the power amplifier 49, and a +300 volt regulated source for operation of various amplifier units in the control console.

In the servo system circuitry a —87 volt reference voltage is derived from the —300 volt supply by means of a voltage reference gas diode tube 81. The —87 volt reference is directly applied through a lead wire 82 to the uphole positioning potentiometers 83 and 84 for in-phase and out-of-phase use, respectively. The movable arms 86 and 87 of the respective potentiometers 83 and 84 are connected through leads 88 and 89 to fixed terminals 91 and 92 of one deck of a phase-control switch 93. The movable arm 94 associated with the terminals 91 and 92 is connected to the input of the amplifier 48 through a load resistor 95. It will be apparent that in the out-of-phase position of the switch 93, an input for the amplifier 48 is derived from the out-of-phase potentiometer 84 while in the in-phase position the in-phase potentiometer 83 is switched into the circuit.

The negative 87 volt reference from the reference supply source 43 is also connected through a lead wire 96 to the phase inverter 44 having unity gain. The phase inverter may comprise any suitable D.-C. amplifier having exactly unity voltage gain and a 180 degree phase shift. Such an amplifier may comprise, for example, a chopper amplifier included in the input of a high gain wide band D.-C. operational amplifier for the stabilization thereof. However, it will be understood that any phase inverter of suitable design may be utilized. The +87 volt output from the phase inverter is connected by a lead wire 97 which extends through the main cable 33, transmitter 36, transmitting coil unit 25', and interconnecting cable 37 to one end of the downhole positioning potentiometers 98 and 99 for in-phase and out-of-phase use, respectively, and which potentiometers are located in the null unit 38 shown in FIGURE 7. An instrument ground connection 101 in the control console 29 is connected by a lead wire 102 through the main cable 33, transmitter 36, transmitting coil unit 25' and interconnecting cable 37 to the other end of the potentiometers 98 and 99 in the null unit. As seen in FIGURE 7, the movable arms 103 and 104 of the respective potentiometers 98 and 99 are connected through lead wires 106 and 107 to fixed terminals 108 and 109 of a downhole remotely controlled, phase-control relay 111. The movable arm 112 associated with the terminals 108 and 109 is connected by a lead wire 113 extending through the interconnecting cable 37, transmitting coil unit 25', transmitter 36 and main cable 33 to the input of the amplifier 48 through a load resistor 114 in the operators control console.

It will be apparent that the negative servo position signal from one of the uphole potentiometers 83 or 84 is added to the positive servo position signal from one of the downhole potentiometers 98 and 99, respectively, and the resulting sum signal is fed to the input of the amplifier 48. The amplifier 48 may be identical with the phase inverter 44, described above, except that the amplifier 48 has a voltage gain of 500 maximum which is controlled by variable negative feedback through a feedback network 116 comprising a shunt connected resistor, capacitor and diodes. The feedback network limits the gain with large signal inputs and thus prevents the amplifier from blocking.

The output from the D.-C. amplifier 48 is amplified by the power amplifier 49 and is sent downhole through a motor current monitoring meter 50 by way of a lead wire 117 through the main cable, transmitter, transmitting coil unit, and interconnecting cable to a movable arm 118 of the downhole phase control relay 111 in the null unit 38 (FIGURE 7). As seen in FIGURE 7, the movable arm 118 is mechanically coupld to the movable arm 112 for simultaneous movement thereof under control of a relay control means, or winding, 119. Fixed contacts 121 and 122 associated with the movable contact arm 118 are connected to "in-phase" and "out-of-phase" servo motors 123 and 124, respectively, whereby the motor drive signal from the lead wire 117 may be applied to either motor. The motor 123 is mechanically coupled to the movable arm 103 of the in-phase servo-positioning potentiometer 98 and to the movable arm 126 of a potentiometer 127 in the in-phase nulling channel of the attenuation network 61 (seen in FIGURE 4). Similarly, the motor 124 is mechanically coupled to the movable arm 104 of the out-of-phase servo-positioning potentiometer 99 and to the movable arm 128 of a potentiometer 129 in the out-of-phase nulling channel of the attenuation network 61. The power ground connection, designated 131, in the operators control is connected by a lead wire 132 through the main cable 33, transmitter 36, transmitting coil unit 25' and interconnecting cable 37 to the other terminals of the servo motors 123 and 124 to complete the motor circuits. It will be understood that the movable arm 103 of the downhole servo-positioning potentiometer 98 will assume the same relative position as the arm 86 of the potentiometer 83, which arm 86 is under control of the operator, when the circuit between the said in-phase potentiometers is completed by the switch 93 and relay 111 in an in-phase position. Thus, it will be understood that the movable arm 126 of the downhole potentiometer 127 is under control of the potentiometer 83 at the operators control console and, in like manner, the movable arm 128 of the potentiometer 129 is under control of the potentiometer 84 at the control console. The servo amplifier system is designed to provide sufficient gain for a minimum servo motor drive signal of 6 volts with a positioning potentiometer resolution of one part in 2000, i.e., one part in 2000 of $10^5$ or $10^6$ p.p.m. of the direct primary field. The servo motors 123 and 124 are high speed reversible D.-C. motors with a gear train for a slow speed high torque output drive to the potentiometers 98 and 99, respectively. Suitable knobs, not shown, at the panel of the operators console are mechanically coupled to the movable arms 86 and 87 for control thereof, the said knobs being provided with suitable associated scales calibrated directly in parts per million of the primary field. The operator adjusts the potentiometers 83 and 84 for a zero indication on the null meter 53 whereupon the positioning of the said potentiometers indicate directly the magnitude of the in-phase and out-of-phase anomalous voltage, respectively, developed at the receiving coil 26.

The scales associated with the knobs which control the potentiometers 83 and 84 indicate a maximum signal range of either $10^5$ or $10^6$ parts per million of the primary field, depending upon the position of a range switch 136 at the operators control console 29, which switch is under control of the operator. As seen in FIGURE 5, the ungrounded 52 volt control circuit supply 79 is connected through a switch 136, which comprises a reversing switch, to a diode and resistor network 137 (which forms a part of the switching control 51 shown in block diagram in FIGURE 4). In the illustrated $10^5$ position of the switch 136, the negative terminal of the 52 volt supply 79 is grounded while the positive terminal thereof is connected through a lead wire 138 to the network 137. The network 137 comprises a resistor 139 in shunt with a pair of series, back-to-back, connected Zener diodes 141, 141 each having a Zener, or reverse breakdown, voltage of 26 volts. In the illustrated in-phase position of the phase control switch 93, the 52 volt supply is connected through the network 137 to the fixed contact 142 of such switch whereby a 26 volt drop is produced across the network. Thus, a positive 26 volt control signal is provided at the movable arm 143 of the switch 93 which is connected to the movable arm 144 of a power control switch 146. A lead wire 147 connects the "on" fixed terminal 148 associated with the movable arm 144 to the switching circuits located in the null unit 38 and receiver 41.

When the reversing switch 136 is actuated to the $10^6$ position, a negative 52 volt potential is applied to the lead wire 138, which potential is reduced to a −26 volts by the network 137. When the phase control switch 93 is in the out-of-phase position, the network 137 is switched out of the circuit and the 52 volt supply is connected to the movable arm 144 of the power switch and thence to the lead wire 147. It will be apparent that high (52 volts) and low (26 volts) voltages of either positive or negative polarity are available as a control signal. The control circuit signal is transmitted downhole via the lead wire 147, and the resulting system function may be tabulated as follows:

(1) No signal=receiver unit and null unit deenergized
(2) +26 volts=$10^5$ range, in-phase measurement
(3) +52 volts=$10^5$ range, out-of-phase measurement
(4) −26 volts=$10^6$ range, in-phase measurement
(5) −52 volts=$10^6$ range, out-of-phase measurement.

The signal applied to the lead wire 147 is used for remote control functional switching of the circuitry in the downhole null and receiver units. In the null unit, as seen in FIGURE 7, a relay control winding 151 is connected in series with a pair of series, back-to-back, connected Zener diodes 152, 152, each having a reverse break down, or Zener, voltage of between 26 and 52 volts, say 40 volts. The series connected winding 151 and diodes 152, 152 are connected between the lead wire 147, which supplies the control signal, and the lead wire 132 comprising the power ground. If the control signal is ± 26 volts, the diodes 152, 152 fail to conduct, and the relay contacts 154, 156 remain in the normally closed position. With a ± 52 volt control signal, the diodes 152, 152 conduct, and current flows through the control winding 151 of the relay 157 to thereby energize the relay and open the contacts 154, 156. The contacts 154, 156 are connected in shunt relation with a load resistor 158 and the control winding 119 of the relay 111. It will be apparent that with the relay contacts 154, 156 in the normally closed position, the relay control winding 119 is short circuited and cannot be energized. Hence, the relay 111 is energizable only when the relay 157 is energized.

A series connected 2.2k ohm load resistor 159 and diode 161 are connected between the control signal lead 147 and a center lead wire 160. Also connected between the lead wires 147 and 160 are a series connected diode 162 and control means comprising the control winding 163 of a relay 164. The control winding 166 of the battery relay 167 is also connected between the lead wires 147 and 160.

With a +26 volt control signal on the lead wire 147, the control relay 157 will not be energized as the 26 volts will be dropped across one of the Zener diodes 152, whereby the contacts 154, 156 remain in the illustrated closed position. The lead 160 is shorted to the power ground lead 132 whereby the control winding 119 of the phase selector relay 111 is short-circuited and the relay contacts remain in the illustrated in-phase control position as shown. The battery relay 166 will be energized and its contacts 171 and 172 will close, thus applying the battery 173 to the null unit. The control winding 163 of the range switching relay 164 will not be energized since current is blocked by the series diode 162, thus the relay 164 contacts remain in the $10^5$ range position, as shown. However, the 2.2k ohm resistor 159 and series diode 161 will conduct, which conduction balances the conduction through the winding 163 when under a different command control signal. It will be understood that the +26 volt control signal selects the $10^5$ range and the in-phase measurement.

With a +52 volt control signal at the lead wire 147, the control relay winding 151 will be energized and its contacts 154, 156 will open. With the proper selection of resistance values for the resistors 158 and 159, +26 volts will be developed between the center lead wire 160 and the ground wire 132. The relay winding 166 of the battery relay 167 will be energized turning the battery 173 on, and the winding 119 of the phase selector relay 111 will be energized switching its contacts to the out-of-phase position. The range switching relay control winding 163 will still not be energized, as explained under the +26 volt signal condition. It will be understood that the +52 volt control signal selects the $10^5$ range and the out-of-phase measurement.

With a −26 volt control signal, the relay control winding 151 will not be energized and, therefore, the relay control winding 119 will remain unenergized. The battery relay control winding 166 will be energized, as will the range switching relay control winding 163. There is no conduction through the series resistor 159 and diode 161 under these conditions. The −26 volt control signal selects the $10^6$ range and the in-phase measurement.

With a −52 volt control signal, the control winding 151 of the control relay 157 is energized, as well as the winding 119 of the phase selector relay 111. The battery relay 167 and range selector relay 164 are also energized. The −52 volt control signal, therefore, selects the $10^6$ range and the out-of-phase measurement.

The control switching lead wires 147 and 160 extend from the null unit 38 through the battery box 39, to the receiver 41, as does the ground wire 132. In the receiver unit, the control winding 176 (FIGURE 8) of a phase selector relay 177 is connected across the leads 160 and 132, in parallel with the winding 119 of the phase selector relay 111 in the null unit (FIGURE 7) whereby such relays operate in like manner. Control means, or windings, 178 and 179 of battery relays 181 and 182, respectively, are connected across lines 147 and 160, in parallel with the winding 166 of the battery relay 167 in the null unit and thus operate in the same manner. That is, the battery relay contacts close whenever a control signal is applied to the lead wire 147. In summary, our novel switching system controls the energization, range of sensitivity, and phases of the signal being observed of down hole equipment through a two wire link connecting the down hole equipment with up hole equipment, which up hole equipment includes means for applying any one of three levels and two polarities of control voltage (0, ±26 v. and ±52 v.) to the two wires for selectively actuating relays in the down hole equipment.

Returning to the operators control console shown in FIGURE 5, the D.-C. null signal output from the phase sensitive demodulator 69 (shown in FIGURE 4) is received via lead wire 184 and is amplified by the D.-C. amplifier 52 having a gain of two. Any suitable type D.-C. amplifier may be used, such as the amplifier 48 described above. The output from the amplifier 52 is connected through a resistor network 186 and a reversing switch 187 to the null meter 53. A pair of limiter diodes 188, 188 protect the null meter 53 from overloads.

FIGURE 6

Reference is now made to FIGURE 6 of the drawings wherein the transmitter and transmitting coil units are schematically shown. The +70 volt supply from the regulated source 42' in the operators control console (FIGURE 5) decreases to +65 volts on lead 77 at the transmitter unit due to the IR drop in the main cable 33. Stabilized +50 and +58 volt potentials at lead wires 191 and 192 are obtained from the +65 volt source by use of Zener diodes 193 and 194, respectively, operating within the Zener region, and associated shunt capacitors 196 and 197. The oscillator 54, which is of novel design, comprises a transistor 198 which is rigidly amplitude stabilized. In the illustrative embodiment, the transistor is of the P-N-P type, although it will be apparent the transistor may be of the N-P-N type, and may be either a point or junction contact type. The transistor input circuit includes the base electrode 199, a series resonant circuit comprising a capacitor 201 and inductor 202, a small resistor 203, a feedback winding 204 of a transformer 206, and a shunt connected resistor 207 and capacitor 208, and emitter 209. The transistor output circuit includes the collector 211, primary winding 212 of the transformer 206 and the +50 volt supply. The output circuit is completed through the positive 65 volt supply and shunt resistor 207 and capacitor 208 to the emitter 209. The transformer windings are provided with polarity markings, whereby it will be apparent that a positive feedback is provided between the winding 212 in the output circuit to the winding 204 in the input circuit whereby oscillations occur. The transistor 198 operates in a substantially linear condition with the incremental changes in collector voltage occurring substantially instantaneously whereby the collector voltage is of a substantially square wave form. The frequency of oscillation is controlled by the values of the capacitor 201 and inductor 202 which are series resonant tuned to the operating frequency of 1230 cycles per second in the illustrated apparatus. Such series resonant circuit serves to effectively filter out harmonics of the tuned frequency. Further, this arrangement provides means whereby the oscillator frequency is maintained over a wide range of coupling factors of the primary, or transmitting, coil with the surrounding rock. Thus, if the unit passess through conducting ore, as it well may in a hole, the frequency is not upset in the neighborhood of intersected ore and reliable readings may be obtained.

The amplitude of the oscillator transistor output is held constant by means of transformer auxiliary windings 213 and 214 and associated diodes 216 and 217, respectively, comprising limiting networks. The base 199 of the transistor 198 is connected through the series connected diode 216 and transformer winding 213 to the lead wire 192 which is maintained at +58 volts by the Zener diode 194. The base 199 is also connected to the +65 volt supply through the transformer winding 214 and diode 217. With the transformer secondary and diodes poled as indicated, the amplitude of the transistor output is rigidly stabilized, since an increase in level beyond the nominal value causes conduction of diodes 216 and 217, removing the signal from the base of transistor 197.

The oscillator output is obtained through an isolating resistor 218 from the junction between the inductor 202 and resistor 203 which connects to the capacitor 201. It will be seen that the output connection is made at the effective parallel resonant point of the tank circuit whereby such output comprises a sine wave of constant amplitude.

The oscillator sine wave output is fed to a transistor 219 and associated circuitry which comprise an emitter follower buffer amplifier stage 221 which is followed by a transistor 222 and associated circuitry which comprise a common emitter driver amplifier stage 223. The driver amplifier 223 feeds a transformer 224 having a pair of secondary windings 226 and 227. Identical signals, of opposite phase, are obtained from the windings 226 and 227 for driving power transistors 228 and 229, respectively, in the power amplifier stage 57. The transistors are operated in a Class B mode in a common emitter grounded collector arrangement with voltage gain. Negative feedback is employed around the power amplifier via a network 231 to hold the gain stable, thus enabling operation of this stage at high output levels without distortion due to clipping. Diodes 232 and 233 with series resistors shunt the respective transformer secondary windings 226 and 227 to protect the power transistors 228 and 229 from being overdriven. A capacitor 234 and the transmitting coil 25 are connected together through lead wires 236 and 237 and are parallel resonant at the operating frequency. The transmitter is capable of delivering approximately 8 watts of power to the transmitting coil with a frequency stability to better than ±0.5% of the operating frequency with the illustrated apparatus.

The transmitting coil 25 comprises four sections which are bifilar wound and balanced about the center line of the coil. The secondary winding 58 comprises two sections balanced about the center line of the coil and develops approximately 18 volts peak to peak for the reference carrier input to the phase sensitive demodulator unit in the receiver unit, the winding 58 being connected through lead wires 238 and 239 to the receiver unit. The single turn secondary winding 59 of the transmitting coil 25 develops approximately 0.8 volt peak to peak for the reference voltage input to the null unit attenuation network, the winding 59 being connected to the null unit through lead wires 241 and 242. The novel mechanical construction of the transmitting coil is shown in FIGURES 11 and 12 and is described in detail hereinbelow.

FIGURE 7

Reference is now made to FIGURE 7 wherein the null unit 38 is shown in schematic form. To null out the direct, or primary, field induced voltage in the receiving coil 26, a portion of the reference voltage developed in the winding 59 is connected through the lead wire 241, a potentiometer 243, a thermistor 244 and lead wire 246 to one end of the receiving coil 26. The receiving coil (FIGURE 9) is connected in series with a pair of resistors, here designated 64A and 64B, to the lead wire 202 at instrument ground potential. The potentiometer 243 in the null unit is carefully adjusted whereby the reference signal which is fed therethrough and which is developed across the resistors 64A and 64B (FIGURE 9) exactly cancels out the voltage induced in the receiving coil as a result of the direct primary field therethrough, it being understood that the reference signal has a 180 degree phase relative to the voltage induced in the receiving coil by the direct primary magnetic field. The thermistor 244 in the connection of the reference voltage to the receiver coil is selected with an appropriate positive temperature coefficient for first order compensation for changes in the separation between the transmitting and receiving coils due to thermal effects. Thus, as the temperature increases, and the coils move farther apart, the primary field at the receiving coil decreases and, by the increase in resistance of the thermistor 244, the primary cancelling signal is decreased and an approximate primary null is maintained.

The null unit 38 also includes adjustable means for developing in-phase and out-of-phase voltages for cancelling out the anomalous in-phase and out-of-phase voltages in the receiving coil. It will be noted that the reference signal from the winding 59 is fed through the lead wires 241, 242 to the potentiometers 127 and 129, in shunt circuit connection, the potentiometer 127 comprising the in-phase nulling channel and potentiometer 129 comprising the out-of-phase nulling channel. Center taps 247 and 248 are provided on the potentiometers, which center taps are connected to the instrument ground connection 101 by lead wire 102 whereby accurate nulling signals at the movable arms 126 and 128 may be obtained, which signals are phased at zero or 180 degrees with respect to ground potential. The in-phase nulling signal from the movable arm 126 of the potentiometer 127 is attenuated without further phase shift by a resistor 251 while the out-of-phase nulling signal from the movable arm 128 of the potentiometer 129 is attenuated and phase shifted 90 degrees by a capacitor 252. The impedances of the resistor 251 and capacitor 252 at the operating frequency of the apparatus are exactly identical. The in-phase and out-of-phase nulling signals are mixed together, developed across a resistor 253, and fed to the input of the summing amplifier 62 comprising transistors 254 and 256. The summing amplifier 62 is a common emitter two-stage amplifier of conventional design and employing negative feedback through a resistive network 257 which network includes a potentiometer 258 for adjustment and stabilization of the amplifier gain. The output from the summing amplifier 62 is fed through a lead wire 259 to the movable contact 261 of the range switching relay 164. In the unenergized, $10^5$ position of the relay 164, the summing amplifier output is connected through a lead wire 262, which extends through the battery box, to the junction between the resistors 64A and 64B in the receiver unit, whereby the summing amplifier output is developed across the resistor 64B. In the energized, $10^6$ position of the relay 164, the summing amplifier output is connected through the lead wire 246 whereby the output is developed across both resistors 64A and 64B (FIGURE 9) in the receiver unit. The combined resistance of the resistors 64A and 64B is 10 times the resistance of the resistor 64B, whereby the maximum signal range that can be handled by the apparatus may be directly changed from $10^5$ to $10^6$ parts per million of the primary field. The gain of the summing amplifier 62 (FIGURE 7) is adjusted by means of the feedback potentiometer 258 such that the precision potentiometers 127 and 129 may be calibrated directly in parts per million of the primary field.

It will be apparent that there are available, at the input of the summing amplifier 62, variable signals with the in-phase component bearing a 0 or 180 degree relationship to the primary flux field and the out-of-phase component bearing a 90 or 270 degree relationship therewith. By appropriate addition of the components, upon proper adjustment of the calibrated potentiometers 127 and 129, it is possible to cancel out an anomalous signal in the receiving coil 26 that has any phase relationship to the primary flux field from 0 to 360 degrees. As described above, the potentiometers 127 and 129 are remotely adjusted by positioning of the potentiometers 83 and 84 in the operator's control console (FIGURE 5).

In FIGURE 7, all of the batteries in the battery box 39 are preferably of the rechargeable nickel-cadmium type. The nominal 9 volt supply 173 for the null unit comprises 8 cells of the button type in series, which are connected to the transistors 254 and 256 through the lead wire 264 and suitable resistor networks. A nominal +6 volt supply, designated 266, and comprising 5 button type cells in series, is connected to the receiver unit 41 through a lead wire 267. A first −7.5 volt source 268 is connected to the receiver through a lead wire 269. A second −7.5 volt source 271 is connected in series with the source 268 to provide a −15 volt potential to the receiver at the lead wire 272.

FIGURES 8 and 9

Reference is now made to FIGURES 8 and 9 which conjointly show the receiver unit 41 in schematic form. The power for operation of the receiver unit is derived from the above described batteries in the battery box which are remotely switched by means of relays 181 and 182, the relay contacts 273, 274 and 276 being included in the battery leads 269, 272 and 267, respectively.

The receiving coil 26 (FIGURE 9) is in series circuit with the resistors 64A and 64B, and the series network is parallel tuned by a capacitor 277 to the operating frequency. The voltage for cancelling out the voltage induced in the receiving coil by the direct magnetic flux field is developed across the resistors 64A and 64B, while the nulling voltage for cancelling the in-phase and out-of-phase components of the secondary signal voltage induced in the receiving coil is developed across both resistors 64A and 64B on the $10^6$ parts per million range, and across only the resistor 64B on the $10^5$ parts per million range. The resulting error signal, comprising the sum of the induced and nulling voltages, is amplified in the two-stage common emitter preamplifier 71 comprising transistors 278 and 279. The illustrated preamplifier has a gain of 40 decibels and negative feedback through a resistor 281 is employed to insure low distortion operation with minimum phase shift characteristics.

The output of the preamplifier is further amplified in the two stage common emitter first limiting amplifier 72 comprising transistors 282 and 283. This limiting amplifier has a maximum voltage gain of 30 times, but limiting means is incorporated in the negative feedback network 284 to variably compress the gain so that large signal inputs or noise transients will not block the amplifier while preserving low distortion and minimum phase shift characteristics.

The output of the first limiting amplifier 72 is further amplified in the two stage common emitter second limiting amplifier 73 comprising transistors 286 and 287 with a variable feedback network 288. This limiting amplifier 73 also has a voltage gain of 30 times and operates in the same manner as the first limiting amplifier 72. By employing individual feedback circuits 281, 284 and 288 around individual amplifier stages, rather than a single feedback around the entire amplifier system, an extremely stable arrangement is provided which does not overload.

The output from the second limiting amplifier 73 is further amplified in a common emitter transistor driver amplifier comprising the transistor 289 (FIGURE 8). A collector load transformer 291 having a center-tapped secondary winding 292 phase splits the output of the driver amplifier for driving transistors 293 and 294 of a push-pull amplifier 296. A feedback network 297 provides a negative feedback around the driver amplifier transistor 289 whereby a driver amplifier voltage gain of about 3 is obtained therefrom.

The push-pull output of the emitter follower transistors 293 and 294 drives the primary winding 298 of a transformer 299, having a center-tapped secondary winding 301. The end terminals of the secondary winding 301 are connected across one diagonal arm of a modulator bridge 302, which is used as a phase sensitive demodulator in our apparatus. The bridge comprises four rectifier elements 303 and series connected resistors 304, the rectifiers being arranged in the same sense in a closed ring which includes the said resistors and a potentiometer 306.

A reference, or switching, signal for the bridge is provided by the reference coil 58 (FIGURE 6) which is coupled through the lead wires 238 and 239 to a resistor-capacitor network comprising a resistor 307 and capacitors 308. The network is coupled through the movable contact 309 of the relay 177 to the primary winding 311 of a transformer 312. In the illustrated out-of-phase position of the contact arm 309 the reference, or switching, signal for the demodulator is obtained through the resistor 307. For in-phase demodulation, the appropriate phase of the reference signal is obtained through the capacitive branch of the network, the reference signal being shifted 90 degrees by the capacitors 308.

The apropriately phased reference signal (as determined by the operating condition of the relay 177) is phase split by the transformer 312, with the end terminals of the secondary winding 313 being connected to push-pull common collector, emitter follower transistors 314 and 316. The push-pull reference signal output is connected through coupling capacitors 317 and 318 across one diagonal of the bridge 302.

A well known property of the bridge 302, in the function of the bridge as a phase sensitive demodulator, is that only the zero phase (or 180 degrees phase) component of the signal current, with respect to the reference current, is present at the output thereof. The demodulated D.-C. output signal is proportional to the magnitude of the component of the input signal that bears a zero or 180 degree relationship to the reference signal input. This signal is obtained from the center taps on the secondary windings of the transformers 298 and 312 and is transmitted uphole to the operators control console through lead wires 184 and 102, and is indicated on the null meter 53.

*Operation*

A brief description of the operation of the apparatus follows. The power suppliers in the operators control console are energized by any suitable source, and with the power switch 146 in the "on" position, transmitter current is supplied to the transmitter 36 and a control signal is sent down hole through the lead wire 147. The oscillator 54 in the transmitter generates a signal of the desired frequency which is amplified and fed to the transmitting coil 25.

Two reference voltages are obtained by means of coils 58 and 59 inductively coupled to the transmitting coil 25. The reference voltage from the coil 59 is split into three components which are developed across a resistor 64B, or resistors 64A and 64B, in series with the coil. One reference signal component is adjusted to cancel out the voltage induced in the receiving coil by the direct primary magnetic flux field. Separate in-phase and out-of-phase reference, or nulling voltages are fed through individual variable attenuators 127 and 129 (controlled by associated servo motors and servo positioning potentiometers). The variably controllable attenuated in-phase and out-of-phase nulling signals, for cancellation of the anomalous in-phase and out-of-phase secondary signal voltages induced in the receiving coil, are added together and applied to the resistor 64B or resistors 64A and 64B in series.

With the voltage induced in the receiving coil 26 by the direct magnetic flux field cancelled out, the input error signal to the receiver comprises the anomalous in-phase and out-of-phase secondary signals resulting from the presence of conducting ore bodies, and the adjustable in-phase and out-of-phase nulling signals from the null unit. The receiver signal is phase sensitive demodulated whereby signals proportional to the separate in-phase and out-of-phase components are obtained and sent up hole to appear on the null meter 53. The operator adjusts the servo positioning potentiometers 83 and 84 in the servo circuitry to provide a zero indication on the null meter 53 on both the in-phase and out-of-phase position of the phase control switch 93. The potentiometers 83 and 84 are calibrated to provide a direct reading, in parts per million of the primary field, of the in-phase and out-of-phase secondary components. The apparatus of our invention is extremely sensitive, the direct effect of the primary coil field at the receiver being compensated to 100 parts per million, or 0.01%. Further, with our apparatus, it will be apparent that the background signal level, due to non-commercial conducting rock nearby, may rise to 10%, and the detectable change is still maintained at 0.01% on the $10^5$ range.

*FIGURES 10 to 13, inclusive*

Various constructional features which permit the use of the apparatus in drill holes having a diameter as small as 1.5 inches are shown in FIGURES 10 to 13. Reference is first made to FIGURE 10, wherein there is shown a receiver unit assembly 41, which unit is also typical in construction of the null unit 38, battery box 39 and transmitter 36. The electronic circuitry (which includes electrical components) is built up on a thin phenolic board rigidly mounted to an angle support strip 321 suspended between the chassis end connectors 322 and 323.

The male end connector 322 has a 19 pin pygmy electrical male connector 324 at the free end thereof for connection to all electrical circuits in the adjacent unit. Two resilient annular O rings 326 provide a pressure water seal between the male connector 322 and its mating connector. Eight (8) holes 327 are provided in the male connector in which stainless steel thread inserts 328 are secured by which mechanical coupling is made with its mating part.

The female end connector 323 is similarly constructed with resilient O rings 326 and stainless steel thread inserts 328, and has a 19 pin pygmy electrical female connector 329 for connection to the adjacent unit. Both end connectors 322 and 323 have electrical connectors and associated wires to the electronic circuitry on the chassis sealed in by potting with a casting epoxy resin.

Over the chassis is installed a protective tubular member, or housing shell 331, which is mechanically coupled to the chassis end connectors using stainless steel Allen head cap screws 332, which, when threaded into the stainless steel thread inserts in the end connectors, act as shear pins. Thus, mechanical coupling to resist tension, compression, and torque forces is accomplished between the housing shell and the male end connector using 8 pins while 4 pins are used in the female end connector solely to hold it in place within the shell. Resilient O rings, in pairs, are used for water sealing wherever there is a path for water entry. It will be apparent from an examination of FIGURE 10 that upon release of the screws 332, shown fastening the end connectors to the tubular member, the said male and female end connectors with the supporting strip 321 and attached electrical components comprise an integral unit which is slidably insertable and removable from the tubular member 331. Such an arrangement provides for ease of construction, maintenance, and the like.

When assembled, each unit has a normal male end 333 at one end and a normal female end 334 at the opposite end of the assembly for mating with the corresponding male or female end of the next unit. In all cases, the male end of each unit is at the end of the assembly pointing toward the collar of the drill hole. In the illustrated arrangement, all of the units, when assembled, have a constant outside diameter of 1.312 inches for easy insertion into 1.5 inch diameter drill holes. The screws 332 terminate below the outer surface of the shell 331, and a water-tight system of coupled flush-jointed rodding is thereby provided which permits withdrawal thereof from a drill hole without wedging even after the surrounding rock may have caved during operation.

The main cable is water-proofed with a normal female end connector potted with casting epoxy resin on the down hole end. The back side (cable side) of the female connector has male acme threads for mating with the split drill hole rods when these are used for propelling the apparatus in the drill hole. The up hole end has a standard AN type connector for connecting the cable to the cable reel.

The cable is constructed with insulated copper conductors built up around a center aircraft cable type steel support member for self strength. Thus, the cable can be used by itself to support the apparatus in the drill hole when the split drill hole rods are not used. This is feasible when working in holes that are inclined near the vertical where gravity feed may be utilized for propelling the apparatus. The cable has a polyethylene outer jacket with an outside diameter of 0.465 inch.

Reference is now made to FIGURES 11 and 12 wherein a fragmentary side view and cross-sectional view, respectively, of the mechanical construction of the transmitting coil unit are shown. In order to maximize the magnetic moment of the transmitting coil and thus the primary magnetic field, the coil is constructed with a core material of a high magnetic premeability. The core comprises a plurality of laminations 336, 337 and 338 having rectangular-shaped cross sections. The laminations are .004 inch thick and are made of silicon-iron grain-oriented magnetic tape to minimize eddy current and hysteresis losses in the core. The laminations are bonded together using an epoxy varnish followed by baking in order to make the core rigid. The laminations of the center group 338 are stacked at 90 degrees to the intermediate and outer groups 336 and 337, respectively, to insure bending strength in all directions.

The inner group 338 is the largest, the intermediate groups 337 are smaller, and the outside groups 336 are the smallest, whereby the outer free edges of the laminations lie on a cylindrical surface. With this construction, eight shoulders or pockets 339 running parallel to the core axis are formed around the periphery of the core which are utilized for housing the various conductors, here designated 341, which extend through the transmitting coil unit.

The two lamination groups 337 extend axially from the main body of the core for mechanical coupling to the coil end connectors 333' and 334' which are secured thereto by rivets 342.

To seal the coil against water entry, the entire coil is encapsulated with epoxy casting resin (not shown) which is reinforced for strength with woven fiber glass tubing (not shown) to a constant diameter of 1.312 inches. Annular grooves 343 in the end connectors facilitate adherence of the encapsulation thereto. It will be apparent that the laminated core comprises the principal longitudinal strength member of the coil construction, with some strength also being provided by the outside encapsulation material.

The interconnecting cable 37 is a waterproof cable with a normal female end connector on the down hole end and a normal male end connector on the up hole end. Both end connectors are potted on the cable with casting epoxy resin. The back side (cable side) of the female connector has male acme threads and the back side of the male connector has female acme threads for coupling to the split drill hole rods 34 shown in FIGURE 3. The interconnecting cable has no steel strength member since split rods 34 are used to provide the desired strength and separation of the units. The cable is enclosed in a suitable neoprene outer jacket with an outside diameter of 0.460 inch.

Reference is now made to FIGURE 13 wherein the receiving coil is shown comprising a plurality of bobbins 346 each having a large number of turns of wire thereon. In one embodiment of the coil construction 16 bobbins 346 are used, with each containing approximately 1300 turns of No. 34 wire. The 16 wound bobbins are series connected with a total of 20,800 turns and the total electrical characteristics of the coil are:

Inductance=160 millihenries
Unloaded figure of merit—Q=10
Parallel tuned impedance=14K ohms A rod 347, of insulating material, supports the bobbins. A taper end 348 of aluminum is located at one end and a male connector 333' is located at the other end thereof. The coil is encapsulated in a manner similar to that of the transmitting coil unit in order to prevent water entry, and the entire coil is covered with a grounded silver conducting paint which electrostatically shields the coil from undesirable electrical fields.

Summary

Having now described our invention in detail in accordance with the requirements of the patent statutes, various changes and modifications will suggest themselves to those skilled in this art. Such charges include:

(1) While the apparatus operates at a frequency of 1230 cycles per second, any frequency in the audio range from a few hundred to several thousand cycles per second may be used;

(2) Although a fixed coil separation of 100 feet is maintained, other separations from several tens to several hundreds of feet are useable;

(3) While in our apparatus coaxial oriented coils are used, other coil configurations with mutual coupling such as coplanar may be used;

(4) While our apparatus utilizes a normal range of measurement from $\pm 10^2$ to $\pm 10^6$ parts per million of the primary field, extensions of this range in the low or high end are possible for different geophysical applications;

(5) Although the illustrated apparatus utilizes a normal resolution of measurement of $\pm 10^2$ p.p.m. for small anomalies against backgrounds up to $10^5$ p.p.m. and $\pm 10^3$ p.p.m. for large anomalies against backgrounds up to $10^6$ p.p.m. increased or decreased resolutions are possible for special applications;

(6) While the method utilizes the measurement of the in-phase and out-of-phase anomalous components of the secondary flux field, it is also possible to make measurements of the total anomalous secondary field and its phase angle relative to the transmitted primary field. It is understood that the above-mentioned quantities are mathematically related by $$A = [\alpha^2 + \beta^2]^{1/2}$$

$$\tan \phi = \frac{\beta}{\alpha}$$

where $A$=the total amplitude of the secondary anomalous field in parts per million of the primary field.

$\phi$=the phase angle between the primary field and the total secondary anomalous field.

$\alpha$ and $\beta$ are as defined in conjunction with the description of FIGURE 1.

Therefore, by knowing any two of the above quantities, the other two quantities may be derived and thus all four quantities are known; and (7) While our method utilizes measurements of the secondary anomalous magnetic field components at discrete stations in the drill hole, it is apparent that an automatic nulling device could be included in the apparatus, such as a servo system, so that continuous recording of both components could be done while the drill hole units of our apparatus are continuously propelled in the drill hole.

It is intended that the above and other such changes and modifications shall fall within the spirit and scope of the invention as recited in the following claims.

We claim:

1. A method of establishing the presence of a subsurface conducting ore body comprising passing an alternating current through a transmitting coil thereby creating a primary alternating magnetic flux field through a region of ground to link with a conducting ore body, obtaining a signal induced in a receiving coil by reason of eddy currents flowing in the conducting ore body, obtaining in-phase and out-of-phase nulling voltage components and in-phase and out-of-phase demodulator switching voltage components relative to the current flowing in the transmitting coil, applying the said nulling voltage components to the receiving coil in degenerative sense relative to the signal voltage induced in the receiving coil to thereby develop an error signal thereat, amplifying the error signal, applying the error signal as an input to a phase sensitive demodulator, feeding either the in-phase or out-of-phase demodulator switching voltage component to the demodulator as a demodulator switching signal, adjusting the in-phase nulling voltage component to cancel out the in-phase signal voltage component at the receiving coil to thereby reduce the demodulator output to zero with an in-phase demodulator switching voltage applied thereto, and adjusting the out-of-phase nulling voltage component to cancel out the out-of-phase signal voltage component at the receiving coil to thereby reduce the demodulator output to zero with an out-of-phase demodulator switching voltage applied thereto.

2. The invention as recited in claim 1 wherein the transmitting and receiving coils and the phase sensitive demodulator are located a fixed spaced distance of about 100 feet apart in a drill hole.

3. A drill hole exploration method comprising placing into the drill hole an elongated unit containing a transmitter, a receiver, a transmitting coil magnetically coupled to a reference coil, a pair of potentiometers, a pair of servo motors each connected to the movable arm of an associated potentiometer, and a receiving coil, passing an alternating current from the transmitter through the transmitting coil to establish a primary alternating magnetic flux field through a selected region of ground to link with a conducting ore body, applying to the receiver the signal voltage induced in the receiving coil by reason of eddy currents flowing in the conducting ore body, deriving in-phase and out-of-phase nulling voltage componets from the voltage induced in the reference coil by the alternating current flowing in the transmitting coil, applying the nulling voltage components to the receiving coil through the potentiometers, adjusting the position of movable arms of the said potentiometers by energizing the servo motors thereby simultaneously adjusting the amplitude of the respective in-phase and out-of-phase nulling voltage components to substantially cancel the signal voltage from the receiving coil to the receiver, obtaining outside of the drill hole indications corresponding to the positions of each of the movable arms of the potentiometers, the relative positions of said arms being taken as indicative of the presence of a conducting ore body.

4. The invention as recited in claim 3 in which the elongated unit contains also a phase sensitive demodulator and a second reference coil magnetically coupled to the transmitting coil, applying the receiver output to the phase sensitive demodulator, applying either an in-phase or out-of-phase reference signal obtained from the second reference coil to the phase sensitive demodulator as a switching signal thereby to obtain either an in-phase or an out-of-phase component output, respectively, of the receiver output voltage from the demodulator, adjusting the in-phase nulling voltage component to cancel out the in-phase component of the said signal voltage thereby to reduce the demodulator output to zero with an in-phase switching signal applied thereto, and adjusting the out-of-phase nulling voltage component to cancel out the out-of-phase component of the said signal voltage thereby to reduce the demodulator output component to zero with an out-of-phase switching signal applied thereto.

5. The invention as recited in claim 3 including controlling the in-phase and out-of-phase nulling voltage components to provide a nulling voltage signal variable in a range of from 0 to ±180 degrees.

6. Apparatus for use in establishing the presence of a sub-surface conducting ore body comprising a transmitting coil; means energizing the said transmitting coil with an exciting current of predetermined frequency to thereby establish a primary magnetic flux field through the ground; a receiving coil tuned to the frequency of the exciting current; means cancelling from the receiving coil voltage the direct signal voltage induced therein by the direct magnetic flux field developed by the transmitting coil; means obtaining in-phase and out-of-phase nulling voltage components and in-phase and out-of-phase demodulator switching components relative to the current flowing in the transmitting coil; means applying said nulling voltage components to the receiving coil in degenerative sense relative to the signal voltage induced in the receiving coil by reason of eddy currents flowing in an ore body lying within the field of influence of the primary flux field to thereby develop an error signal thereat; means amplifying the error signal; a phase sensitive demodulator having as an input the said error signal; switching means operable to connect either the in-phase or out-of-phase demodulator switching voltage to the demodulator to thereby provide a demodulator output corresponding to the magnitude and positive or negative sense of either the in-phase or out-of-phase component, respectively, of the error signal developed at the receiving coil; and individual means adjusting the respective in-phase and out-of-phase nulling voltage components to cancel out substantially the error signal to thereby reduce the demodulator output to zero with either an in-phase or out-of-phase demodulator switching voltage applied thereto.

7. The invention as recited in claim 6 wherein the said individual means adjusting the respective in-phase and out-of-phase nulling voltage components includes a first and second pair of potentiometers, a servo-amplifier, switching means connecting either the first pair or the second pair of potentiometers together through the servo-amplifier, the nulling voltage components being individually adjustable from a remote position.

8. The invention as recited in claim 7 wherein the apparatus is adapted for drill hole exploration, means mounting the transmitting and receiving coils a fixed distance of about 100 feet apart, means inserting the transmitting and receiving coils in the drill hole, one potentiometer of each pair of potentiometers being located in the drill hole and the other potentiometers being located outside the drill hole, the nulling voltage components being individually adjustable from outside the drill hole.

9. Apparatus for drill hole exploration comprising an operators control console for use outside the drill hole, said control console including a null indicating instrument; and a plurality of elongated drill hole units mechanically attachable to each other in axial relationship and insertable into the drill hole, the said drill hole units including; a receiving coil unit carrying a receiving coil at the down hole end of the drill hole, a receiver unit carrying a receiver and attached to one end of the receiving coil unit with the receiver and receiving coil electrically connected, a battery unit containing batteries and attached to one end of the receiver unit, a null unit carrying variable attenuators controllable at the operators control console and attached to one end of the battery unit, a transmitting coil unit carrying a transmitting coil and an inductively coupled reference coil, an interconnecting cable unit attached between the null unit and the transmitting coil unit, a transmitter unit carrying a source of alternating current for driving the transmitting coil unit and attached to one end of the transmitting coil unit, and a main cable connecting the transmitter to the operators control console.

10. Apparatus for drill hole exploration comprising a down hole unit containing a transmitter, a transmitting coil, a receiver, and a receiving coil which unit is adapted to be extended into the drill hole, an operators console outside of the drill hole and electrically connected to the down hole unit, sources of equal D.-C. potentials of opposite polarity outside the drill hole, a pair of servo-positioning potentiometers with one in the down hole unit and one up hole outside of the drill hole, means connecting the D.-C. potential of one polarity across the down hole servo-positioning potentiometer and means connecting the D.-C. potential of opposite polarity across the up hole servo-positioning potentiometer, a servo motor in the down hole unit and controlling the position of the movable arm of the down hole potentiometer, an amplifier, means connecting the movable arms of the up hole and down hole servo positioning potentiometers together and to the input of the said amplifier, means connecting the amplifier output to the servo motor to energize the motor, a variable attenuator also mechanically connected to the motor and controlled thereby, means obtaining a nulling voltage component, and means applying the nulling voltage component to the receiving coil through the said variable attenuator in degenerative sense relative to a signal voltage induced in the receiving coil to thereby develop an error signal thereat, the said variable attenuator being adjusted to cancel out substantially the said error signal, the relative position of the up hole servo positioning potentiometer being indicative of the presence of a conducting body.

11. Apparatus for drill hole exploration comprising a down hole unit containing a transmitter, a transmitting coil, a receiver, and a receiving coil which unit is adapted to be extended into the drill hole, a servo system which includes up hole and down hole potentiometers and a down hole motor for positioning the movable arm of the down hole potentiometer, means impressing equal voltages of opposite polarity across the potentiometers whereby the movable arms thereof are at equal but opposite polarity potentials at corresponding positions of the said movable arms, means connecting the movable arms of the potentiometers together and to the motor to thereby energize the motor when the movable arms are not at corresponding potentiometer positions, means deriving a null voltage component, a variable attenuator, means connecting the null voltage component through the variable attenuator to the said receiving coil, means connecting the down hole motor to the attenuator to control the attenuation thereby, the attenuator being adjustable by the motor to provide a nulling voltage component to the receiver coil which cancels out one phase of the signal received thereat, the position of the movable arm of the up hole potentiometer being indicative of the presence or absence of a conducting body.

12. The invention as recited in claim 11 including an in-phase and an out-of-phase up hole servo-positioning potentiometer, in-phase and out-of-phase down hole servo-positioning potentiometers, an in-phase and an out-of-phase servo motor in the down hole unit, and an in-phase and an out-of-phase variable attenuator, means deriving in-phase and out-of-phase nulling voltage components, switching means manually controlled from outside the drill hole for connecting either the in-phase servo-positioning potentiometers together or the out-of-phase servo-positioning potentiometers together and to the said opposite polarity potentials, means connecting the in-phase null voltage component through the in-phase variable attenuator and the out-of-phase null voltage component through the out-of-phase variable attenuator to the receiving coil, the said switching means also connecting the in-phase servo motor to the in-phase attenuator or the out-of-phase servo motor to the out-of-phase attenuator for the control thereof.

References Cited by the Examiner

UNITED STATES PATENTS

| | | | |
|---|---|---|---|
| 983,258 | 1/11 | Bliss | 339—92 |
| 2,220,070 | 11/40 | Aiken | 324—6 |
| 2,424,243 | 7/47 | Lowell | 317—137 X |
| 2,502,578 | 4/50 | McDaniel | 317—123 |
| 2,507,301 | 5/50 | Fulbright | 317—123 |
| 2,512,639 | 6/50 | Gohorel | 317—137 X |
| 2,647,173 | 7/53 | Beurtheret | 330—100 |
| 2,652,458 | 9/53 | Miller | 330—100 |
| 2,714,693 | 8/55 | Van Eyk | 317—137 |
| 2,746,022 | 5/56 | Gilbert | 339—92 |
| 2,788,483 | 4/57 | Doll | 324—6 |
| 2,874,293 | 2/59 | McMurren | 331—109 |
| 2,874,348 | 2/59 | Brant et al. | 324—6 |
| 2,938,173 | 5/60 | Popowsky | 331—109 |
| 2,941,129 | 6/60 | Horn | 317—158 |
| 2,982,888 | 5/61 | Whearley | 317—158 |
| 2,992,366 | 7/61 | Veltfort | 317—137 |
| 2,995,699 | 8/61 | Snelling et al. | 324—6 X |
| 3,051,892 | 8/62 | Huston | 324—6 |
| 3,065,407 | 11/62 | Huddleston et al. | 324—6 |
| 3,105,190 | 9/63 | Norris | 324—6 |
| 3,108,220 | 10/63 | Ruddock | 324—6 |
| 3,123,766 | 3/64 | Ruddock et al. | 324—6 X |

WALTER L. CARLSON, *Primary Examiner.*

LLOYD McCOLLUM, *Examiner.*